(12) United States Patent
Maruyama et al.

(10) Patent No.: US 11,403,270 B2
(45) Date of Patent: Aug. 2, 2022

(54) SYSTEM CONFIGURATION DERIVATION DEVICE, METHOD, AND PROGRAM

(71) Applicant: NEC Corporation, Tokyo (JP)

(72) Inventors: Takashi Maruyama, Tokyo (JP); Takayuki Kuroda, Tokyo (JP); Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 56 days.

(21) Appl. No.: 16/973,974

(22) PCT Filed: Apr. 8, 2019

(86) PCT No.: PCT/JP2019/015312
§ 371 (c)(1),
(2) Date: Dec. 10, 2020

(87) PCT Pub. No.: WO2019/244446
PCT Pub. Date: Dec. 26, 2019

(65) Prior Publication Data
US 2021/0256004 A1 Aug. 19, 2021

(30) Foreign Application Priority Data
Jun. 22, 2018 (JP) .............................. JP2018-118930

(51) Int. Cl.
*G06F 16/21* (2019.01)
*G06F 16/2457* (2019.01)
(Continued)

(52) U.S. Cl.
CPC ........ *G06F 16/219* (2019.01); *G06F 9/44505* (2013.01); *G06F 16/2474* (2019.01); *G06F 16/24573* (2019.01); *G06N 20/00* (2019.01)

(58) Field of Classification Search
None
See application file for complete search history.

(56) References Cited

U.S. PATENT DOCUMENTS 9,530,110 B2 * 12/2016 Allen ..................... G06N 5/042
10,063,445 B1 * 8/2018 Preece ................ H04L 41/0866
(Continued)

FOREIGN PATENT DOCUMENTS

JP       H02-058131 A    2/1990
JP       2011-013750 A   1/2011
(Continued)

OTHER PUBLICATIONS

International Search Report for PCT Application No. PCT/JP2019/015312, dated Jul. 9, 2019.
(Continued)

*Primary Examiner* — Amresh Singh
(74) *Attorney, Agent, or Firm* — Sughrue Mion, PLLC

(57) ABSTRACT

An information extraction unit 82 extracts a set including pieces of predetermined information from a past search history for each change of a configuration requirement. A learning unit 83 uses a collection of the sets as learning data to learn a calculation method for calculating a score indicating the degree of appropriateness of a concretizing rule included in the set including the pieces of predetermined information. A search unit 86 repeats extracting the set including the pieces of predetermined information for each pair including a concretizing rule applicable to a configuration requirement of interest and an application part of the concretizing rule in the configuration requirement of interest, calculating a score for the set, and newly selecting a configuration requirement as a configuration requirement of interest based on the score.

10 Claims, 20 Drawing Sheets

(51) Int. Cl.
   *G06N 20/00*     (2019.01)
   *G06F 16/2458*   (2019.01)
   *G06F 9/445*     (2018.01)

(56) References Cited

U.S. PATENT DOCUMENTS

| 10,122,577 | B1* | 11/2018 | Rykowski | G06F 16/24578 |
| 2010/0332444 | A1* | 12/2010 | Akatsu | G06N 5/003 |
| | | | | 706/54 |
| 2018/0225133 | A1 | 8/2018 | Kuroda | |

FOREIGN PATENT DOCUMENTS

| JP | 2017-129995 A | 7/2017 |
| WO | 2017/033441 A1 | 3/2017 |

OTHER PUBLICATIONS

T. Binz et al., "Portable Cloud Services Using TOSCA", Internet Computing, IEEE, vol. 16, No. 3, pp. 80-85, Apr. 20, 2012.
Ryan Beckett et al., "Don't Mind the Gap: Bridging Network-wide Objectives and Device-level Configurations", Proceedings of the 2016 ACM SIGCOMM Conference, pp. 328-341, Aug. 22-26, 2016.
P. Jayaraman et al., "Model Composition in Product Lines and Feature Interaction Detection Using Critical Pair Analysis", Model Driven Engineering Languages and Systems, pp. 151-165, 2007.
Mathias Niepert et al. "Learning Convolutional Neural Networks for Graphs", [searched on Jun. 14, 2018], Internet <URL: http://proceedings.mlr.press/v48/niepert16.pdf>.

* cited by examiner

FIG. 12
(1) CONCRETIZING RULE
    CONCRETIZING RULE B (REFER TO FIG. 10(b))
(2) UNIT CONFIGURATION REQUIREMENT
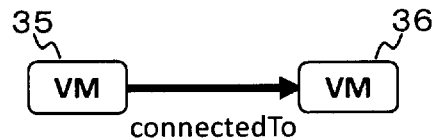
(3) NEIGHBOR INFORMATION OF
    UNIT CONFIGURATION REQUIREMENT
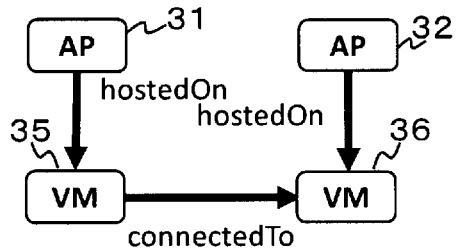
(4) HISTORY INFORMATION OF
    UNIT CONFIGURATION REQUIREMENT
CONCRETIZING RULE A (REFER TO FIG. 10(a))
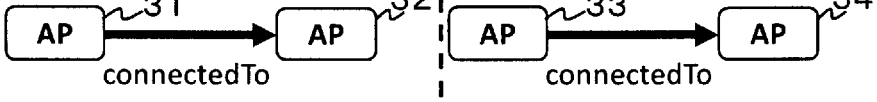
PART CIRCLED WITH DASHED LINE IS APPLICATION PART OF CONCRETIZING RULE A.

SYSTEM CONFIGURATION DERIVATION DEVICE, METHOD, AND PROGRAM

This application is a National Stage Entry of PCT/JP2019/015312 filed on Apr. 8, 2019, which claims priority from Japanese Patent Application 2018-118930 filed on Jun. 22, 2018, the contents of all of which are incorporated herein by reference, in their entirety.

TECHNICAL FIELD

The present invention relates to a system configuration derivation device, a system configuration derivation method, and a system configuration derivation program.

BACKGROUND ART

NPL 1 describes a technique in which, with use of a template for components as a development property, the way to combine the components is changed, and a value for a parameter defined for each component is changed, to perform design in accordance with a system that is to be constructed.

NPL 2 describes a technique in which, based on topology information regarding a communication network and information regarding communication requirements, setting of route information and the like of each network device requested to satisfy the communication requirements in the topology is automatically designed.

NPL 3 describes a technique in which transformation that is executable on a base configuration expressed as a graph is defined as a graph rewriting rule, and the base configuration is rewritten in accordance with the selected rule, to perform design in accordance with a system that is to be constructed.

PTL 1 describes a design data automatic generation device including a rule storage unit storing a set of rewriting rules for rewriting a variable node in a graph of a design architecture of a system expressed as a hierarchical structure.

PTL 2 describes a construction method for constructing an expert system.

PTL 3 describes a system construction support system which has an advantage that it is not necessary to add a setting corresponding to each combination of components.

Also, NPL 4 describes a technique for machine learning for graphs.

CITATION LIST

Patent Literature

PTL 1: Japanese Patent Application Laid-Open No. 2011-13750
PTL 2: Japanese Patent Application Laid-Open No. Hei-2 (1990)-58131
PTL 3: International Publication No. 2017/033441

Non Patent Literature

NPL 1: T. Binz, G. Breiter, F. Leyman, and T. Spatzier, "Portable cloud services using tosca", Internet Computing, IEEE, vol. 16, no. 3, pp. 80-85, 2012.
NPL 2: Beckett, Ryan and Mahajan, Ratul and Millstein, Todd and Padhye, Jitendra and Walker, David, "Don't Mind the Gap: Bridging Network-wide Objectives and Device-level Configurations", Proceedings of the 2016 ACM SIGCOMM Conference, pp. 328-341, 2016.
NPL 3: P. Jayaraman, J. Whittle, A. Elkhodary, and H. Gomaa, "Model Composition in Product Lines and Feature Interaction Detection Using Critical Pair Analysis", Model Driven Engineering Languages and Systems, pp. 151-165, 2007.
NPL 4: Mathias Niepert, Mohamed Ahmed, Konstantin Kutzkov, "Learning Convolutional Neural Networks for Graphs", [searched on Jun. 14, 2018], Internet <URL: http://proceedings.mlr.press/v48/niepert16.pdf>

SUMMARY OF INVENTION

Technical Problem

In constructing a system, it is preferable to enable a configuration of the system to be derived efficiently.

Therefore, an object of the present invention is to provide a system configuration derivation device, a system configuration derivation method, and a system configuration derivation program enabling a configuration of a system to be derived efficiently in constructing the system.

Solution to Problem

A system configuration derivation device according to the present invention is a system configuration derivation device that repeats update of a configuration requirement of a system to be constructed to concretize the configuration requirement of the system to be constructed, and includes search history storage means that stores a search history for a configuration requirement determined to be appropriate previously, information extraction means that extracts, for each change from one configuration requirement into a subsequent configuration requirement, a set including pieces of predetermined information including a concretizing rule applied to the one configuration requirement from the search history, the concretizing rule being a rule in which a part of a configuration requirement is rewritten so as to be described further in detail, learning means that uses, as learning data, a collection of the sets including the pieces of predetermined information extracted by the information extraction means to learn a calculation method for calculating a score indicating a degree of appropriateness of a concretizing rule included in the set including the pieces of predetermined information, concretizing rule storage means that stores a plurality of concretizing rules, input means into which a new configuration requirement is input, and search means that repeats reading, from the concretizing rule storage means, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair. In a case in which the new configuration requirement is input into the input means, the search means selects the new configuration requirement as a configuration requirement of interest. In a case in which there are no sets including the pieces of predetermined information that have been scored before and have not been selected, the search means selects the set including the pieces of predetermined information having the highest score among the sets including the pieces of predetermined information extracted for the respective pairs.

Also, a system configuration derivation method according to the present invention is a system configuration derivation method for repeating update of a configuration requirement of a system to be constructed to concretize the configuration requirement of the system to be constructed, and includes extracting, for each change from one configuration requirement into a subsequent configuration requirement, a set including pieces of predetermined information including a concretizing rule applied to the one configuration requirement from a search history for a configuration requirement determined to be appropriate previously, the concretizing rule being a rule in which a part of a configuration requirement is rewritten so as to be described further in detail, using, as learning data, a collection of the extracted sets including the pieces of predetermined information to learn a calculation method for calculating a score indicating a degree of appropriateness of a concretizing rule included in the set including the pieces of predetermined information, repeating reading, from concretizing rule storage means that stores a plurality of concretizing rules, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair, in a case in which a new configuration requirement is input, selecting the new configuration requirement as a configuration requirement of interest, and in a case in which there are no sets including the pieces of predetermined information that have been scored before and have not been selected, selecting the set including the pieces of predetermined information having the highest score among the sets including the pieces of predetermined information extracted for the respective pairs.

Also, a system configuration derivation program according to the present invention is a system configuration derivation program that causes a computer to repeat update of a configuration requirement of a system to be constructed to concretize the configuration requirement of the system to be constructed, and causes the computer to execute information extraction processing for extracting, for each change from one configuration requirement into a subsequent configuration requirement, a set including pieces of predetermined information including a concretizing rule applied to the one configuration requirement from a search history for a configuration requirement determined to be appropriate previously, the concretizing rule being a rule in which a part of a configuration requirement is rewritten so as to be described further in detail, learning processing for using, as learning data, a collection of the sets including the pieces of predetermined information extracted in the information extraction processing to learn a calculation method for calculating a score indicating a degree of appropriateness of a concretizing rule included in the set including the pieces of predetermined information, and search processing for repeating reading, from concretizing rule storage means that stores a plurality of concretizing rules, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair, in a case in which a new configuration requirement is input, select the new configuration requirement as a configuration requirement of interest, and in the search processing, in a case in which there are no sets including the pieces of predetermined information that have been scored before and have not been selected, select the set including the pieces of predetermined information having the highest score among the sets including the pieces of predetermined information extracted for the respective pairs. Also, the present invention may be a computer-readable recording medium having recorded therein the aforementioned system configuration derivation program.

Advantageous Effects of Invention

According to the present invention, in constructing a system, a configuration of the system can be derived efficiently.

BRIEF DESCRIPTION OF DRAWINGS

FIG. 12 It is a schematic diagram illustrating an example of a four-piece set.

DESCRIPTION OF EMBODIMENTS

Figure 1:
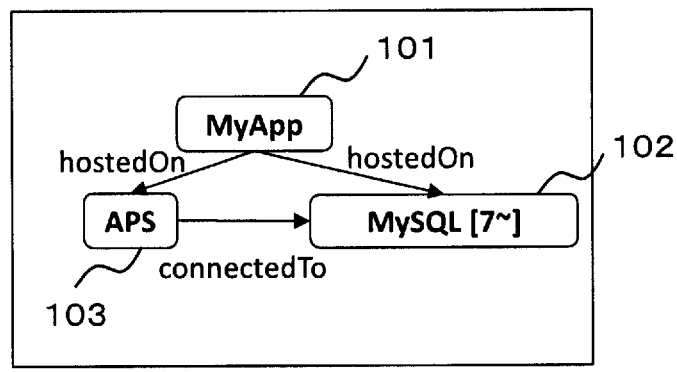
FIG. 1 It depicts a schematic diagram illustrating an example of a configuration requirement.

Before describing exemplary embodiments of the present invention, a technique related to the present invention, which is considered by the inventor of the present invention, will be described. The related technique will be described below.

As a technique for deriving a concrete information and communication technology (ICT) system configuration, the inventor of the present invention has considered the following technique. The technique considered by the inventor, which will be described below, is referred to as an inventor-considered technique.

In the following description, a "configuration requirement" is information indicating configuration components or information indicating a relationship between configuration components in an ICT system serving as a construction target. The configuration requirement may include both the information indicating the configuration components and the information indicating the relationship between the configuration components. The configuration components and the relationship between the configuration components represent a requirement for the ICT system. The configuration component included in the configuration requirement may be software or hardware.

The configuration requirement may also include information indicating abstract (in other words, non-concrete) configuration components and information indicating an abstract (non-concrete) relationship between the configuration components. "The configuration component is not concrete" means that the name of the configuration component is not made concrete or that, even in a case in which the name of the configuration component is made concrete, the relationship with another configuration component that the configuration component requires is not made concrete. Also, whether or not the relationship between the configuration components is concrete is determined in advance in accordance with the type of the relationship. For example, a relationship "HostedOn" is determined in advance as a concrete relationship, and a relationship "ConnectedTo" is determined in advance as a non-concrete relationship.

The configuration requirement can be expressed by a graph in which the configuration components are represented as nodes and in which the relationship between the configuration components is represented as an edge. For the node representing the configuration component, a name of a "type" of the configuration component is described, and for the edge representing the relationship between the configuration components, a name of a "type" of the relationship is described. In the name of each "type", a function of the configuration component having the name or a feature or the like of the relationship having the name is determined in advance. For the node representing the configuration component, an attribute value (for example, version information) may be described in addition to the name of the "type".

Also, a rule in which a part of a configuration requirement is rewritten so as to be described further in detail is referred to as a "concretizing rule".

FIG. 1 depicts a schematic diagram illustrating an example of a configuration requirement. In the example illustrated in FIG. 1, a type "MyApp" described for a configuration component 101 is a name of concrete application software. Also, for a configuration component 102, "MySQL" is described as a type, and [7~] indicating the version of "MySQL" is described as an attribute value. A type "APS" is described for a configuration component 103. "APS" means an application server. Also, in the example illustrated in FIG. 1, "HostedOn" and "ConnectedTo" are illustrated as types of edges each indicating a relationship between the configuration components. "HostedOn" means that a configuration component on a side of an edge represented by an arrow, which is an opposite side of an arrowhead side of the arrow, is hosted by a configuration component on the arrowhead side (in other words, the configuration component on the opposite side of the arrowhead side is operated on the configuration component on the arrowhead side). "connectedTo" means that connection is established to enable communication by a network. An edge for which "connectedTo" is described and which is represented by an arrow indicates that a configuration component on a side of the arrow, which is an opposite side of an arrowhead side of the arrow, approaches a configuration component on the arrowhead side for communication.

Figure 2:
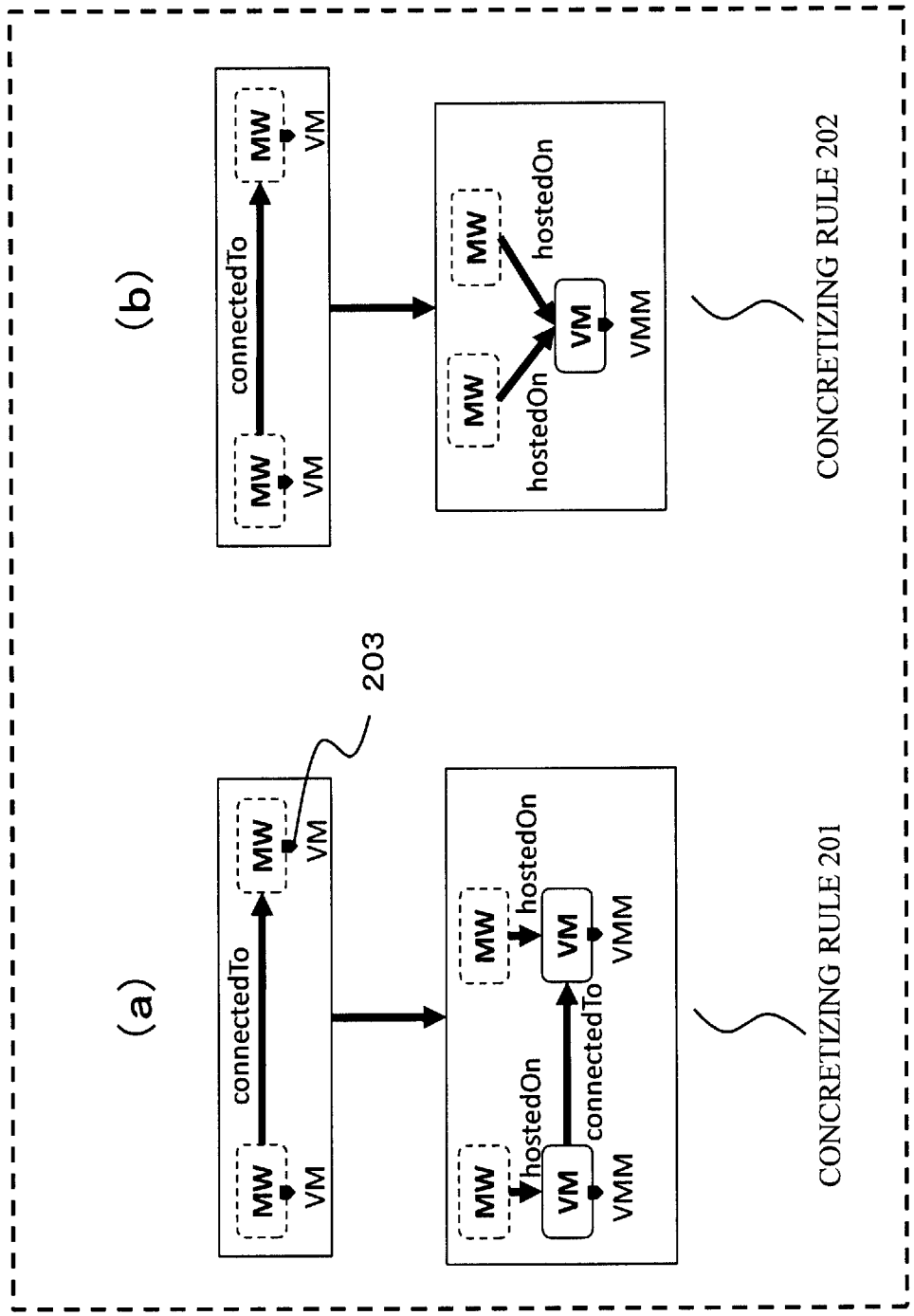
FIG. 2 It depicts a schematic diagram illustrating an example of a concretizing rule.

FIG. 2 depicts a schematic diagram illustrating an example of a concretizing rule. In FIG. 2, two concretizing rules 201 and 202 are illustrated. The concretizing rule indicates that, in a case in which there is a part in the configuration requirement that matches the upper stage of the concretizing rule, the part is rewritten further in detail as illustrated on the lower stage of the concretizing rule. The concretizing rule 201 illustrated in FIG. 2(a) and the concretizing rule 202 illustrated in FIG. 2(b) have the content on the upper stage in common. As illustrated in FIG. 2, there may be a plurality of concretizing rules that have the content on the upper stage in common.

A mark 203 illustrated in FIG. 2 means that a configuration component to which the mark 203 is added requires another configuration component. The required configuration component may be described near the mark 203. For example, the example illustrated on the upper stage of each of FIGS. 2(a) and 2(b) means that a configuration component "MW (middleware)" requires another configuration component "VM (virtual machine)". The required configuration component may not be described near the mark 203.

Also, "VMM" means a hypervisor.

In the inventor-considered technique, a plurality of types of concretizing rule is stored in a computer in advance, for example. Also, a configuration requirement is input into the computer. The computer selects all of the concretizing rules applicable to the input configuration requirement. That is, the computer selects all of the concretizing rules whose upper part corresponds to a part of the configuration requirement. Subsequently, the computer derives a configuration requirement describing the part of the configuration requirement further in detail for each of the selected concretizing rules. The computer selects, from among the newly obtained configuration requirements, one configuration requirement that satisfies a criterion for "good concretization", and selects all of the concretizing rules applicable to the configuration requirement. Further, the computer derives a configuration requirement describing the part of the configuration requirement further in detail for each of the selected concretizing rules. The computer selects, from among the newly obtained configuration requirements and the configuration requirements having been derived and not having been selected, one configuration requirement that satisfies a criterion for "good concretization". The computer repeats similar processing and ends the processing in a case in which the configuration requirement selected as a configuration requirement that satisfies a criterion for "good concretization" cannot be concretized any more.

Figure 3:
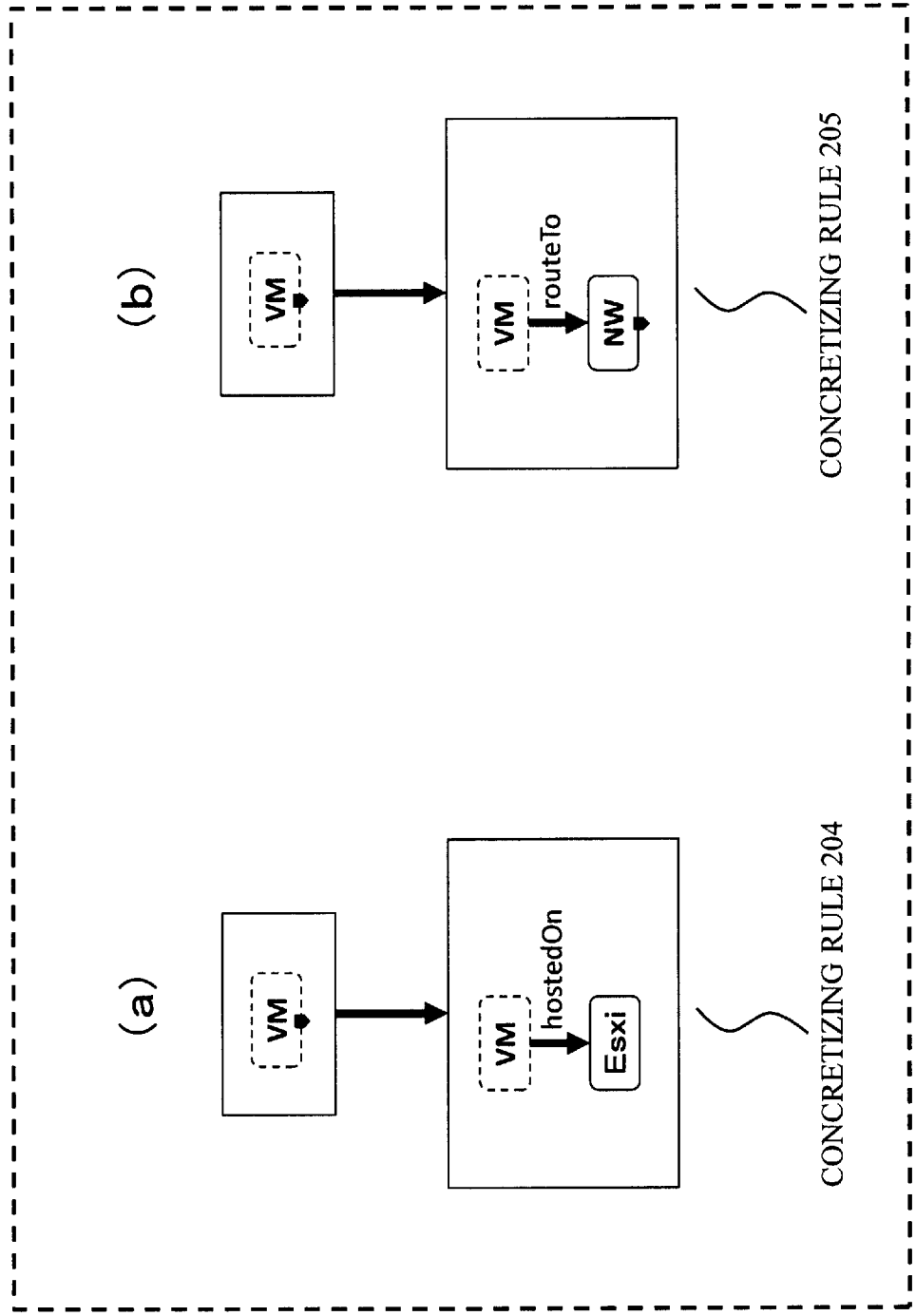
FIG. 3 It depicts a schematic diagram illustrating an example of a concretizing rule.
Figure 4:
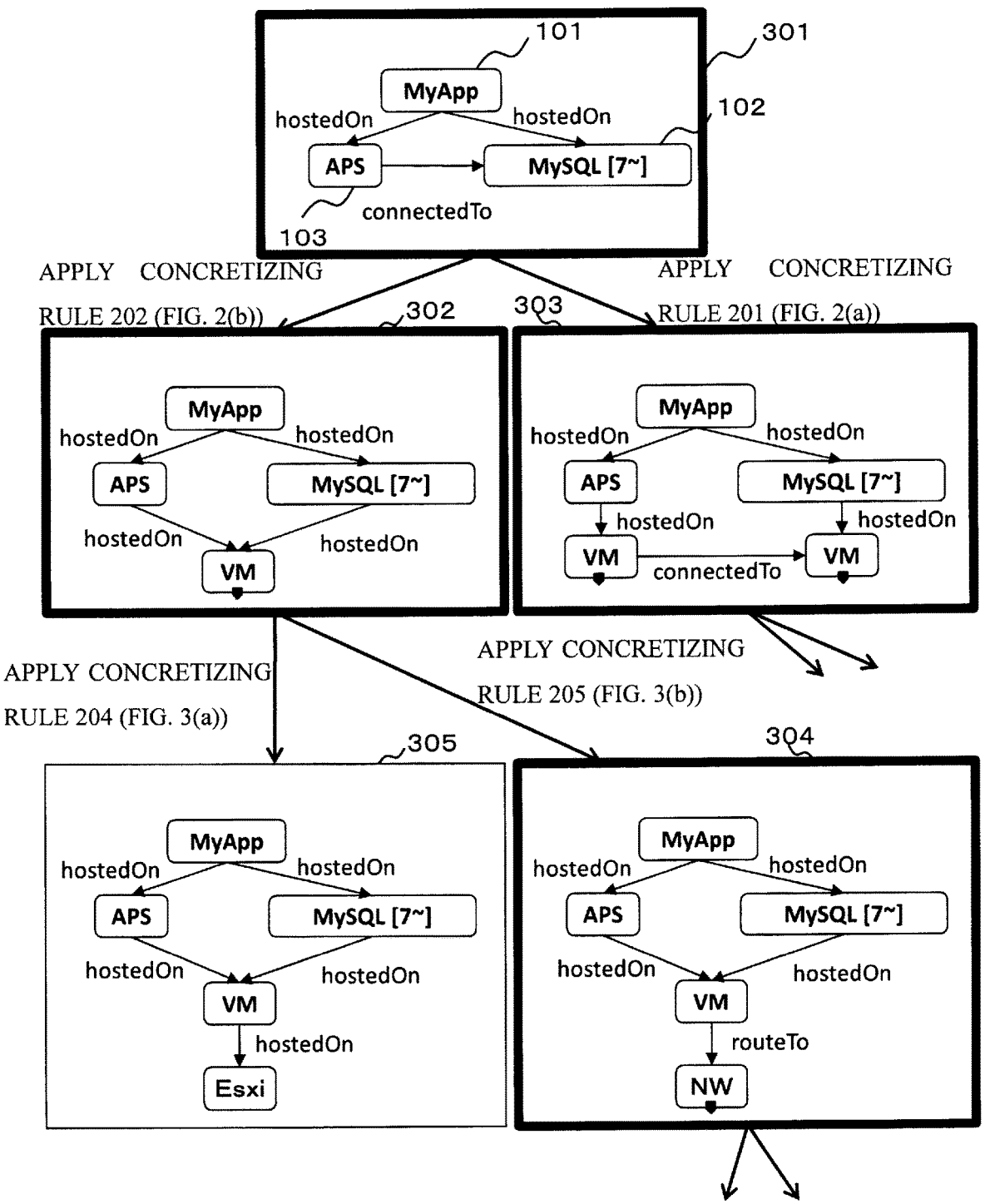
FIG. 4 It depicts a schematic diagram illustrating examples of configuration components selected based on a criterion for "good concretization" in an inventor-considered technique.

Hereinbelow, configuration requirements that the computer sequentially selects will be described with use of a specific example. The example described below is an example of a case in which the configuration requirement illustrated in FIG. 1 is first input into the computer. Also, the computer stores not only the concretizing rules 201 and 202 illustrated in FIGS. 2(a) and 2(b) but also concretizing rules 204 and 205 illustrated in FIGS. 3(a) and 3(b) and other concretizing rules. Meanwhile, "Esxi (Elastic Sky Xi)" illustrated in FIG. 3(a) means a virtualization platform. "NW" illustrated in FIG. 3(b) means a network. Also, the specific example described below is an example of a case in which a criterion "the number of configuration components included in the configuration requirement is the smallest" is used as the criterion for "good concretization". However, the criterion for "good concretization" is not limited to this example. FIG. 4 depicts a schematic diagram illustrating examples of configuration components selected based on the criterion for "good concretization". A configuration requirement that has been input is represented by reference sign "301".

The computer selects the concretizing rules 201 and 202 (refer to FIG. 2) as concretizing rules applicable to the input configuration requirement 301. The computer then applies the concretizing rule 202 (refer to FIG. 2(b)) to the configuration requirement 301 to derive a configuration requirement 302 and applies the concretizing rule 201 (refer to FIG. 2(a)) to the configuration requirement 301 to derive a configuration requirement 303. The computer selects the configuration requirement 302 from the configuration requirements 302 and 303 based on the criterion "the number of configuration components included in the configuration requirement is the smallest". Also, the computer selects the concretizing rules 204 and 205 (refer to FIG. 3) as concretizing rules applicable to the configuration requirement 302. The computer then applies the concretizing rule 205 (refer to FIG. 3(b)) to the configuration requirement 302 to derive a configuration requirement 304 and applies the concretizing rule 204 (refer to FIG. 3(a)) to the configuration requirement 302 to derive a configuration requirement 305. The computer selects, from among the newly obtained configuration requirements 304 and 305 and the configuration requirement 303 having been derived and not having been selected, the configuration requirement 303 based on the aforementioned criterion. Further, the computer selects concretizing rules applicable to the configuration requirement 303 and derives new configuration requirements (not illustrated in FIG. 4) from the configuration requirement 303 with use of the concretizing rules. The computer selects, from among the newly obtained configuration requirements and the configuration requirements 304 and 305 having been derived and not having been selected, the configuration requirement 304 based on the aforementioned criterion. In FIG. 4, the configuration requirements selected in the description of the above specific example are indicated by thick lines. In the description of the above specific example, the "configuration requirement 301", the "configuration requirement 302", the "configuration requirement 303", and the "configuration requirement 304" are selected in this order. The computer repeats similar processing after selecting the configuration requirement 304 and ends the processing in a case in which the configuration requirement selected as a configuration requirement that satisfies the criterion cannot be concretized any more.

Meanwhile, the inventor has considered that a constraint condition for the configuration requirements that satisfy the criterion may be set. For example, the inventor has considered that a constraint condition "a relationship between a specific configuration component and another configuration component is never "connectedTo"" or the like may be set. In this case, even a configuration requirement that satisfies the criterion is not selected unless such a constraint condition is satisfied.

The aforementioned inventor-considered technique can be regarded as a kind of tree search problem. A configuration requirement selected as a configuration requirement that satisfies the criterion and that cannot be concretized any more corresponds to a leaf node, and the configuration requirement 301 (refer to FIG. 4) serving as a starting point corresponds to a root node. The path can be traced from the root node to the leaf node, and all of the configuration requirements on the path from the root node to the leaf node are configuration requirements that have been selected as configuration requirements that satisfy the criterion. For example, in a case in which a lower-level configuration requirement than the configuration requirement 304 corresponds to the leaf node, the path from the root node to the leaf node is "configuration requirement 301→configuration requirement 302→configuration requirement 304→ . . . ". All of the configuration requirements included in this path are the configuration requirements that have been selected as configuration requirements that satisfy the criterion.

The inventor has considered that a history of searches for configuration requirements that satisfy the criterion at the time of deriving a concretized configuration requirement based on an input configuration requirement for constructing an ICT system previously is recorded per ICT system constructed previously.

The inventor has also considered the following technique in addition to the aforementioned inventor-considered technique. The computer stores a plurality of types of concretizing rule in advance as in the aforementioned inventor-considered technique. The computer then repeatedly selects all of the configuration requirements obtained based on the concretizing rules as long as the constraint condition is satisfied, using an input configuration requirement as the root node of the tree structure, and in a case in which the selected configuration requirement cannot be concretized any more, the computer no longer derives a new configuration requirement from the configuration requirement. This technique is referred to as an exhaustive search technique. In the exhaustive search technique, a tree structure in which a plurality of leaf nodes exist is obtained. Accordingly, in the exhaustive search technique, a plurality of configuration requirements corresponding to leaf nodes is obtained. A designer determines the most favorable configuration requirement from among the plurality of configuration requirements. In this case as well, the path can be traced from the root node (input configuration requirement) to the configuration requirement determined to be the most favorable. The inventor has considered that the path from the root node to the configuration requirement determined to be the most favorable at the time of constructing an ICT system previously is recorded per ICT system constructed previously as a favorable search history.

The inventor has then examined whether the recorded past search history for configuration requirements can be used for efficiently searching a favorable configuration requirement based on a new configuration requirement at the time of constructing a new ICT system. The inventor has considered that the past search history may be obtained based on the inventor-considered technique, by the exhaustive search technique, or by another technique.

However, the inventor has considered that a problem arises in a case in which the past search history for configuration requirements is used for efficiently searching a favorable configuration requirement based on a new configuration requirement.

Figure 5:
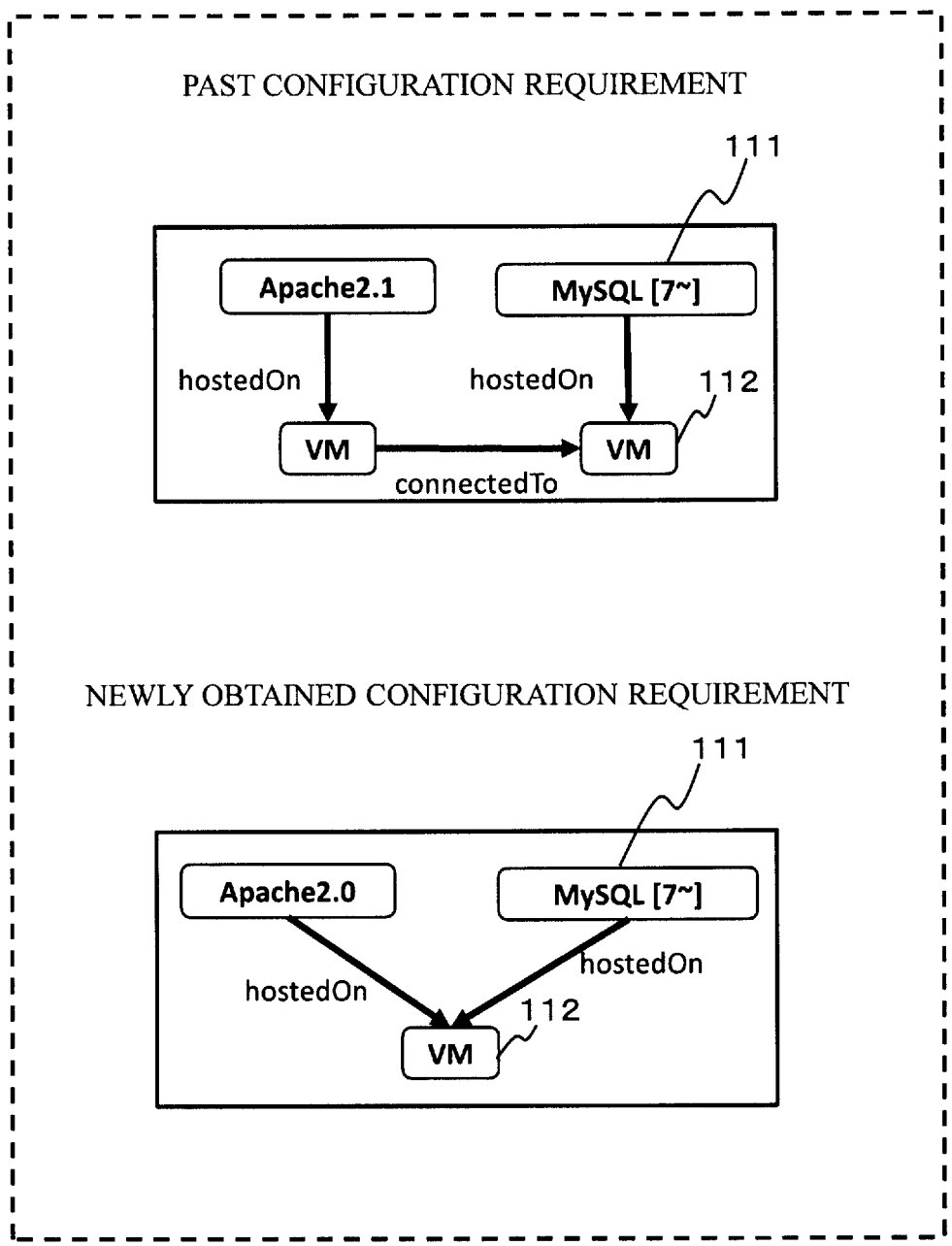
FIG. 5 It depicts a schematic diagram illustrating an example of the difficulty in specifying similarity between configuration requirements.
Figure 6:
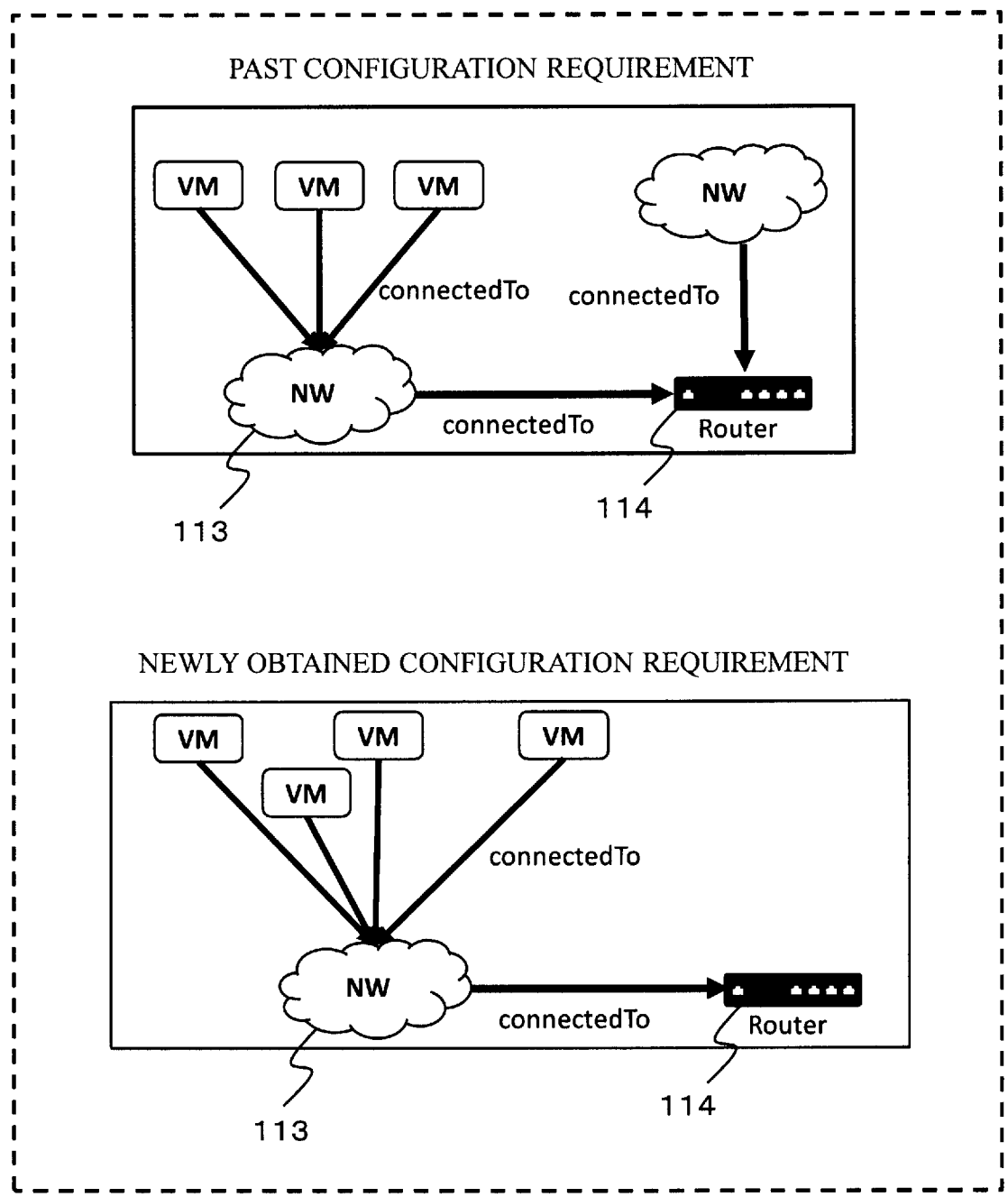
FIG. 6 It depicts a schematic diagram illustrating an example of the difficulty in specifying similarity between configuration requirements.

A first problem that the inventor has considered is a problem in which, at the time of searching a new configuration requirement, the new configuration requirement and the configuration requirement included in the previous search history must be compared to derive similarity between the configuration requirements, and it is difficult to specify the similarity. In a case in which the similarity between the configuration requirements cannot be specified, it is difficult to use the past search history at the time of searching the new configuration requirement. FIGS. 5 and 6 depict schematic diagrams each illustrating an example of the difficulty in specifying similarity between configuration requirements. FIG. 5 illustrates a past configuration requirement and a newly obtained configuration requirement. The two configuration requirements are similar in that a configuration component 111 (My SQL [7~]) and a configuration component 112 (VM) are connected in a "hostedOn" relationship. However, since the two configuration requirements are not similar in terms of the other configuration components, the similarity between the past configuration requirement and the newly obtained configuration requirement cannot be defined. Similarly, FIG. 6 illustrates a past configuration requirement and a newly obtained configuration requirement. The two configuration requirements are similar in that a configuration component 113 (NW) and a configuration component 114 (router) are connected in a "connectedTo" relationship. However, when attention is focused on the other configuration components, there are differences in the number of VMs and the presence/absence of an NW other than the configuration component 113, it is difficult to quantify such differences, and the similarity between the two configuration requirements cannot be defined. In this manner, since it is difficult to define the similarity, it is difficult to use the past search history at the time of searching the new configuration requirement.

Figure 7:
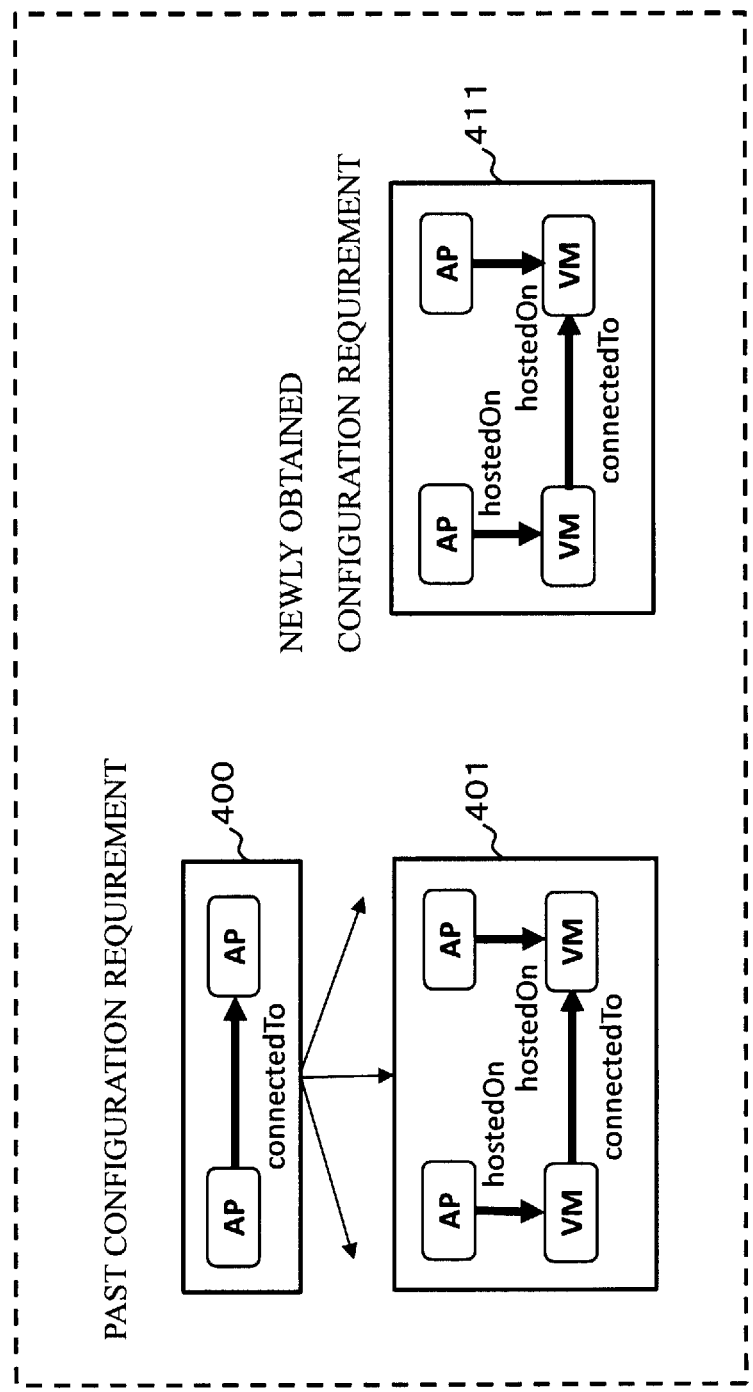
FIG. 7 It depicts a schematic diagram illustrating an example of a second problem in a technique related to the present invention, which is considered by the inventor of the present invention.

A second problem that the inventor has considered is a point in which there is a case in which, even in a case in which the past configuration requirement and the newly obtained configuration requirement are totally equal to each other, intentions to design the two configuration requirements differ, and in such a case, it is difficult to use a past search history at the time of searching the new configuration requirement. The case in which the two totally equal configuration requirements have different intentions to design the configuration requirements is a case in which the two configuration requirements have different sources. FIG. 7 depicts a schematic diagram illustrating an example of the second problem. Configuration requirements 400 and 401 illustrated in FIG. 7 are past configuration requirements, and a configuration requirement 411 is a newly obtained configuration requirement. The configuration requirement 401 and the configuration requirement 411 are equal. However, the configuration requirement 401 is a configuration requirement obtained by applying a predetermined concretizing rule to the configuration requirement 400. Therefore, the configuration requirement 401 is obtained for the purpose of "APs (applications) are intended to be connected". On the other hand, the configuration requirement 411 is a configuration requirement given as a starting configuration requirement, and there is no source configuration requirement. Therefore, the configuration requirement 411 is not obtained for the purpose of "APs (applications) are intended to be connected". In this manner, since the configuration requirement 401 and the configuration requirement 411 are equal but have different sources, the configuration requirements have different design intentions. Accordingly, even in a case in which a search history for configuration requirements subsequent to the configuration requirement 401 is used as it is to efficiently search configuration requirements subsequent to the configuration requirement 411, an appropriate search cannot be performed.

The above is the technique related to the present invention, which is considered by the inventor of the present invention. According to the present invention described below, the first problem and the second problem described above are solved.

Hereinbelow, exemplary embodiments of the present invention will be described with reference to the drawings.

First Exemplary Embodiment

Since a "configuration requirement" and a "concretizing rule" are used in the present invention as well, the "configuration requirement" and the "concretizing rule" will be described in the exemplary embodiments although the "configuration requirement" and the "concretizing rule" in the present invention are similar to the "configuration requirement" and the "concretizing rule" in the aforementioned inventor-considered technique.

A "configuration requirement" is information indicating configuration components or information indicating a relationship between configuration components in an ICT system serving as a construction target. The configuration requirement may include both the information indicating the configuration components and the information indicating the relationship between the configuration components. The configuration components and the relationship between the configuration components represent a requirement for the ICT system. The configuration component included in the configuration requirement may be software or hardware.

The configuration requirement may also include information indicating abstract (in other words, non-concrete) configuration components and information indicating an abstract (non-concrete) relationship between the configuration components. "The configuration component is not concrete" means that the name of the configuration component is not made concrete or that, even in a case in which the name of the configuration component is made concrete, the relationship with another configuration component that the configuration component requires is not made concrete. Also, whether or not the relationship between the configuration components is concrete is determined in advance in accordance with the type of the relationship. For example, a relationship "HostedOn" is determined in advance as a concrete relationship, and a relationship "ConnectedTo" is determined in advance as a non-concrete relationship.

The configuration requirement can be expressed by a graph in which the configuration components are represented as nodes and in which the relationship between the configuration components is represented as an edge. For the node representing the configuration component, a name of a "type" of the configuration component is described, and for the edge representing the relationship between the configuration components, a name of a "type" of the relationship is described. In the name of each "type", a function of the configuration component having the name or a feature or the like of the relationship having the name is determined in advance. For the node representing the configuration component, an attribute value (for example, version information) may be described in addition to the name of the "type".

An example of the configuration requirement can be illustrated in FIG. 1, for example. Since FIG. 1 has already been described, the description is omitted here.

The "concretizing rule" is a rule in which a part of the configuration requirement is rewritten so as to be described further in detail. Examples of the concretizing rule include the concretizing rules 201 and 202 illustrated in FIG. 2, for example. The concretizing rule indicates that, in a case in which there is a part in the configuration requirement that matches the upper stage of the concretizing rule, the part is rewritten further in detail as illustrated on the lower stage of the concretizing rule. As illustrated in FIG. 2, there may be a plurality of concretizing rules that have the content on the upper stage in common. Since the mark 203 illustrated in FIG. 2 has already been described, the description is omitted here.

Figure 8:
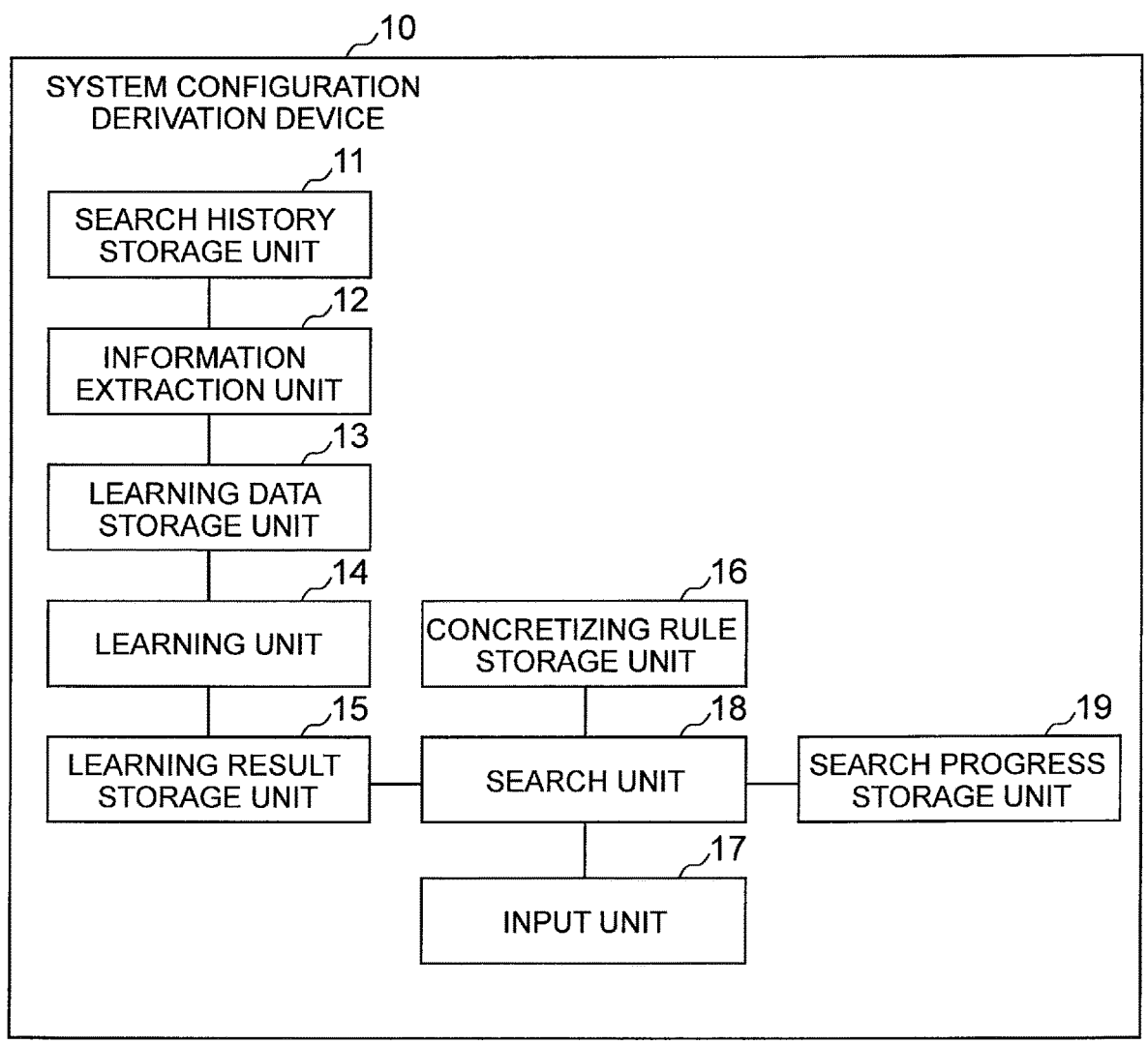
FIG. 8 It depicts a block diagram illustrating an example of a system configuration derivation device according to a first exemplary embodiment of the present invention.

FIG. 8 depicts a block diagram illustrating an example of a system configuration derivation device according to a first exemplary embodiment of the present invention. A system configuration derivation device 10 according to the present exemplary embodiment includes a search history storage unit 11, an information extraction unit 12, a learning data storage unit 13, a learning unit 14, a learning result storage unit 15, a concretizing rule storage unit 16, an input unit 17, a search unit 18, and a search progress storage unit 19.

The search history storage unit 11 is a storage device that stores a search history for configuration requirements determined to be appropriate previously. The search history for configuration requirements stored in the search history storage unit 11 is a search history at the time of deriving a concretized configuration requirement based on a given configuration requirement to construct an ICT system previously and is a search history for configuration requirements determined to be appropriate.

For example, a computer to which the aforementioned inventor-considered technique is applied searches configuration requirements that satisfy a criterion for "good concretization", starting from an input configuration requirement, until the computer searches a configuration requirement that satisfies the criterion for "good concretization" and that cannot be concretized any more. This configuration requirement corresponds to a leaf node in a tree structure, and the configuration requirement serving as a starting point corresponds to a root node. As described above, all of the configuration requirements on the path from the root node to the leaf node are configuration requirements that have been selected as configuration requirements that satisfy the criterion. An administrator of the system configuration derivation device 10 stores the respective configuration requirements on the path ordered from the root node side to the leaf node side and the respective concretizing rules used at the time of deriving a subsequent configuration requirement from each configuration requirement on the path in the search history storage unit 11 in advance as a search history for configuration requirements determined to be appropriate previously.

The search history stored in the search history storage unit 11 is not limited to the search history obtained based on the aforementioned inventor-considered technique. For example, a computer to which the aforementioned exhaustive search technique is applied repeatedly selects all of the configuration requirements obtained based on the concretizing rules as long as the constraint condition is satisfied, starting from an input configuration requirement, and generates a tree structure in which a plurality of configuration requirements corresponding to leaf nodes exist. The designer then determines the most favorable configuration requirement from among the plurality of configuration requirements corresponding to the leaf nodes. In this case, the path can be specified from the root node (input configuration requirement) to the configuration requirement determined to be the most favorable. The administrator of the system configuration derivation device 10 may store the respective configuration requirements on the path ordered from the root node side to the leaf node side and the respective concretizing rules used at the time of deriving a subsequent configuration requirement from each configuration requirement on the path in the search history storage unit 11 in advance as a search history for configuration requirements determined to be appropriate previously.

The number of search histories for configuration requirements stored in the search history storage unit 11 is not limited to one. The administrator of the system configuration derivation device 10 collects a search history obtained based on the aforementioned inventor-considered technique or exhaustive search technique, for example, at the time of constructing an ICT system previously and stores the search history in the search history storage unit 11. Meanwhile, the search history stored in the search history storage unit 11 may be a search history obtained based on a technique other than the inventor-considered technique and the exhaustive search technique.

Figure 9:
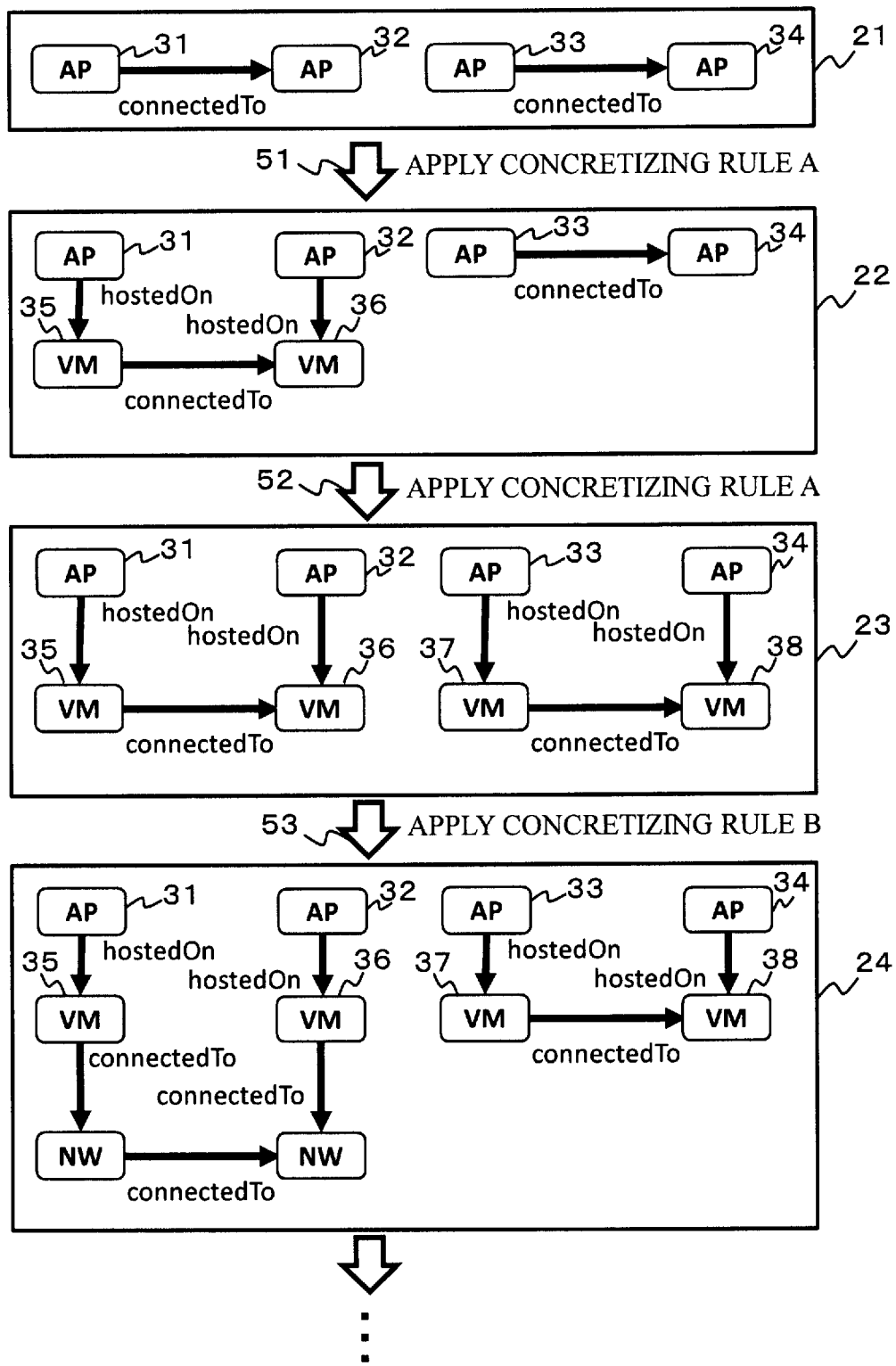
FIG. 9 It depicts a schematic diagram illustrating an example of a search history for configuration requirements.

FIG. 9 depicts a schematic diagram illustrating an example of the search history for configuration requirements stored in the search history storage unit 11. In the example illustrated in FIG. 9, a configuration requirement 21 is a configuration requirement given first and serves as a starting point. In the example illustrated in FIG. 9, the configuration requirement 21 includes configuration components 31 to 34, the configuration component 31 (AP) and the configuration component 32 (AP) are connected in a "connectedTo" relationship, and similarly, the configuration component 33 (AP) and the configuration component 34 (AP) are connected in a "connectedTo" relationship.

The search history illustrated in FIG. 9 indicates that a concretizing rule A is applied to the configuration requirement 21 to cause the configuration requirement 21 to change into a configuration requirement 22, that the concretizing rule A is applied to the configuration requirement 22 to cause the configuration requirement 22 to change into a configuration requirement 23, and that a concretizing rule B is applied to the configuration requirement 23 to cause the configuration requirement 23 to change into a configuration requirement 24. Note that changes of configuration requirements subsequent to the configuration requirement 24 are also included in the search history but are not illustrated in FIG. 9. As is apparent from FIG. 9, in the search history, a concretizing rule is assigned to each change from one configuration requirement into a subsequent configuration requirement. For example, the "concretizing rule A" is assigned to a change 51 from the configuration requirement 21 into the configuration requirement 22. A concretizing rule is assigned to each of the other changes 52, 53, and the like.

Figure 10:
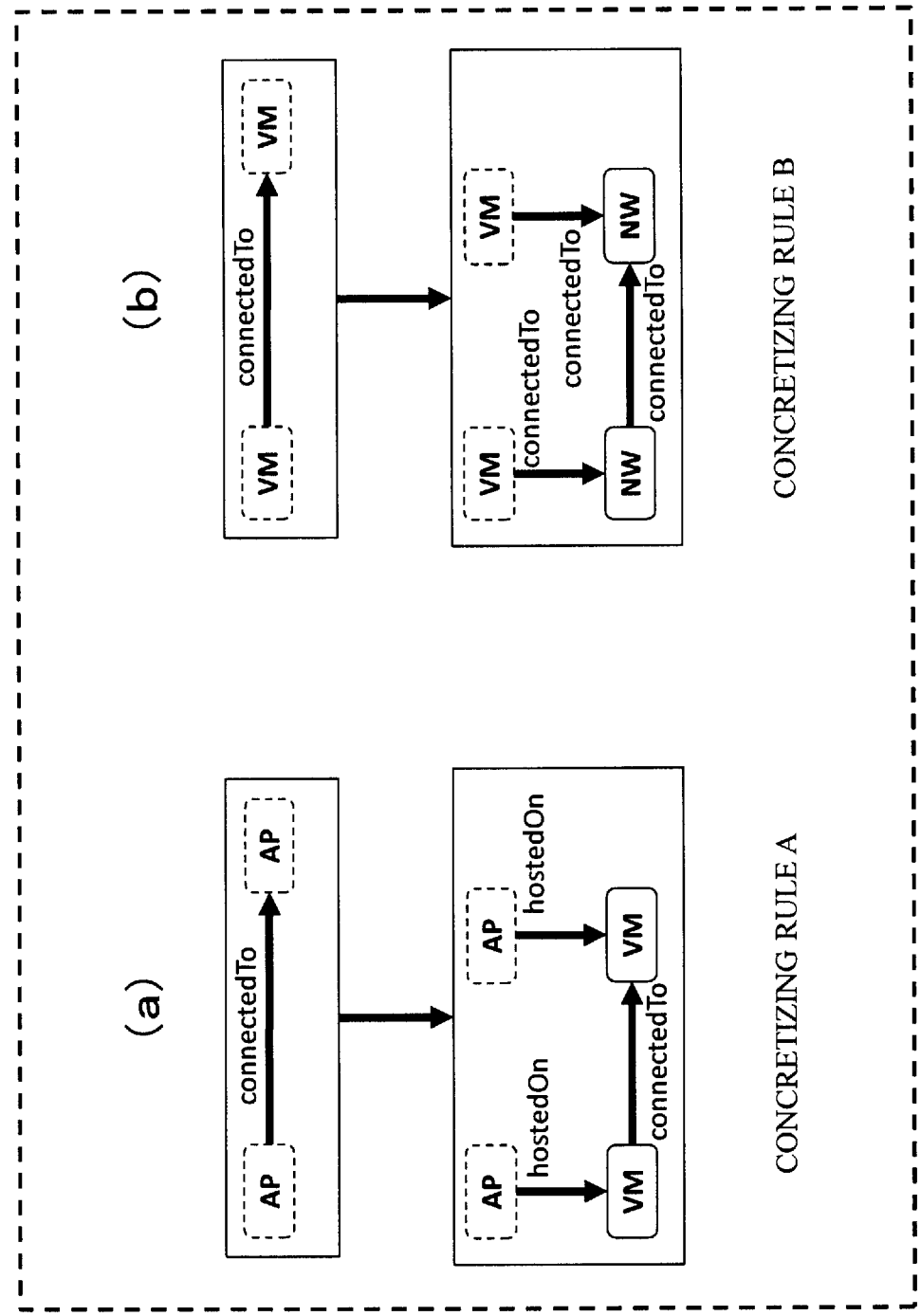
FIG. 10 It depicts a schematic diagram illustrating a concretizing rule A and a concretizing rule B in FIG. 9.

FIG. 10 depicts a schematic diagram illustrating the concretizing rule A and the concretizing rule B in FIG. 9.

The information extraction unit 12 extracts a set including pieces of predetermined information including a concretizing rule from a search history stored in the search history storage unit 11 (refer to FIG. 9 for an example thereof) for each change from one configuration requirement into a subsequent configuration requirement. The set including pieces of predetermined information that the information extraction unit 12 extracts for each change will be described further in detail.

The information extraction unit 12 extracts a set including four types of information (hereinbelow referred to as a four-piece set) as the aforementioned set including pieces of predetermined information. The four types of information included in the four-piece set are the following information.
(1) Concretizing rule
(2) Unit configuration requirement
(3) Neighbor information of unit configuration requirement
(4) History information of unit configuration requirement Note that this four-piece set is an example of the aforementioned set including pieces of predetermined information and that the aforementioned set including pieces of predetermined information may be other than this four-piece set. Hereinbelow, a case in which the aforementioned set including pieces of predetermined information is this four-piece set will be described as an example.

The aforementioned four types of information (1) to (4) will be described.

The information extraction unit 12 extracts a four-piece set from a search history for each change from one configuration requirement into a subsequent configuration requirement. As described above, a concretizing rule is assigned to each change from one configuration requirement into a subsequent configuration requirement. The information extraction unit 12 extracts a concretizing rule assigned to a change from which a four-piece set is to be extracted as one of the pieces of information included in the four-piece set. That is, the concretizing rule included in the four-piece set is the concretizing rule assigned to the change of the configuration component.

A "unit configuration requirement" is a part, in a configuration requirement to which a concretizing rule is applied, rewritten based on the concretizing rule. Also, this configuration requirement is a configuration requirement before a change. Based on configuration requirements before and after the change from which the four-piece set is to be extracted and a concretizing rule assigned to the change, the information extraction unit 12 extracts a unit configuration requirement from the configuration requirement before the change.

Figure 11:
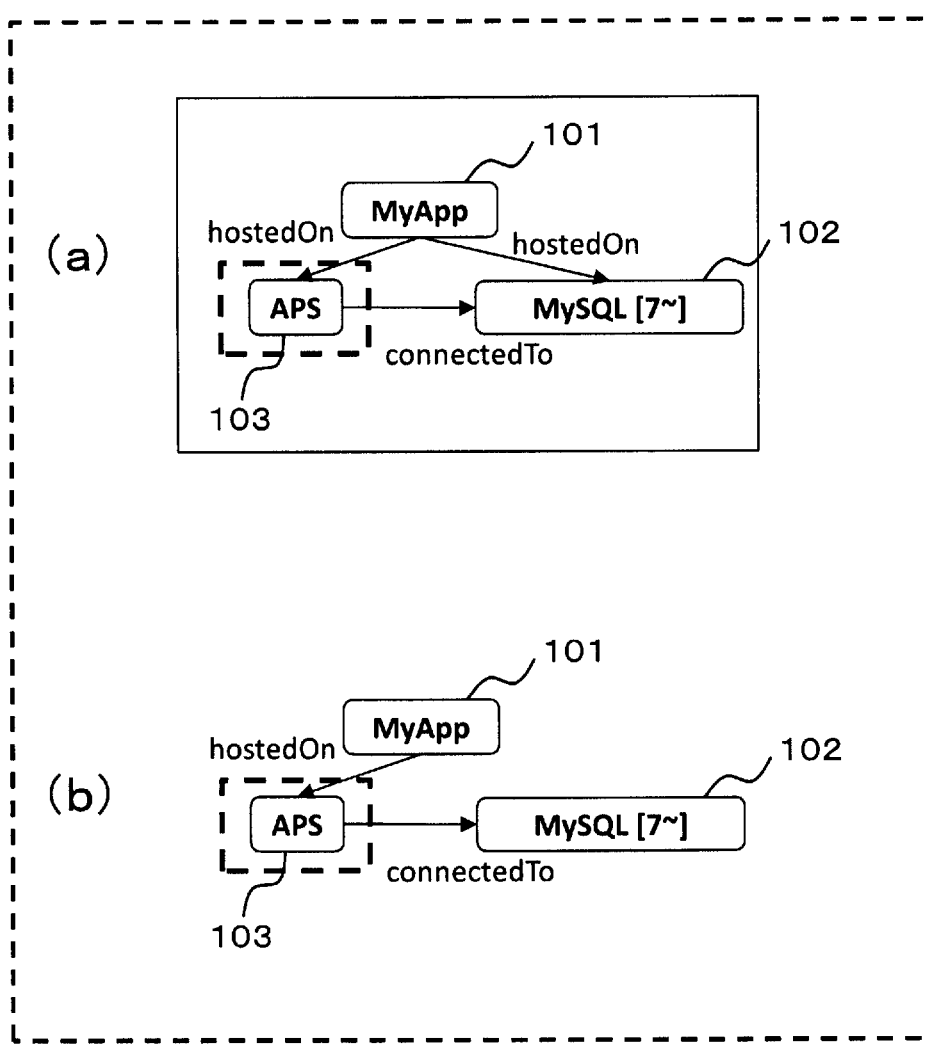
FIG. 11 It depicts a schematic diagram illustrating an example of neighbor information of a unit configuration requirement.

A "neighbor information of a unit configuration requirement" is information about the neighborhood of a unit configuration requirement. Hereinbelow, the neighbor information of the unit configuration requirement may be referred to simply as the neighbor information. The neighbor information is information indicating a unit configuration requirement, a configuration component and a relationship between configuration components residing within N hops from the unit configuration requirement, for example. A name of a "type" is described for the configuration component and the relationship between the configuration components included in the neighbor information. For the configuration component and the relationship between the configuration components included in the neighbor information, an attribute value (for example, version information) may be described in addition to the name of the "type". In this example, the unit configuration requirement is included in the neighbor information. However, the neighbor information is not limited to the above example. Another example of the neighbor information will be described below. The value of N in the N hops is N=1, for example, but is not limited to N=1, and may be N=2, N=3, or the like. In the following description, a case of N=1 is taken as an example. That is, in the following description, a case will be described as an example in which information indicating the unit configuration requirement, the configuration component and the relationship between the configuration components residing within one hop from the unit configuration requirement are the neighbor information. FIG. 11 depicts a schematic diagram illustrating an example of the neighbor information.

FIG. 11(a) illustrates a configuration requirement. The unit configuration requirement included in this configuration requirement is the configuration component 103 (APS). FIG. 11 is illustrated with the unit configuration requirement circled with a dashed line. In this case, the neighbor information is information indicating the configuration component 103 (unit configuration requirement), the configuration component and the relationship between configuration components residing within one hop from the configuration component 103. FIG. 11(b) illustrates this neighbor information. In FIG. 11(b), the configuration components 101 and 102 are configuration requirements residing within one hop from the configuration component 103 (unit configuration requirement). Also, the relationship between the configuration components 103 and 101 (hostedOn) corresponds to the relationship between the configuration components residing within one hop from the configuration component 103. Similarly, the relationship between the configuration components 103 and 102 (connectedTo) corresponds to the relationship between the configuration components residing within one hop from the configuration component 103. On the other hand, the relationship between the configuration components 101 and 102 (hostedOn, refer to FIG. 11(*a*)) does not correspond to the relationship between the configuration components residing within one hop from the configuration component 103 and is not included in the neighbor information.

Also, one or a plurality of constraint conditions for neighbor information may be designated in advance. For example, a specific type of the configuration component is designated as the constraint condition. In this case, the information extraction unit 12 includes as the neighbor information a configuration component corresponding to the designated type out of configuration components residing within one hop from the unit configuration requirement and a relationship between the configuration component in the unit configuration requirement and the configuration component corresponding to the designated type. On the other hand, the information extraction unit 12 does not include as the neighbor information a configuration component not corresponding to the designated type out of configuration components residing within one hop from the unit configuration requirement and a relationship between the configuration component in the unit configuration requirement and the configuration component not corresponding to the designated type. The same applies to cases other than N=1.

History information of unit configuration requirement is information including a concretizing rule used in connection with generation of a unit configuration requirement and information indicating to which part of which configuration requirement the concretizing rule is applied. In other words, "a concretizing rule used in connection with generation of a unit configuration requirement" is a concretizing rule contributing to generation of "a configuration component included in a unit configuration requirement, a relationship between configuration components, and a configuration component and a relationship from which the configuration component included in the configuration requirement and the relationship are generated". Here, "a configuration component and a relationship from which the configuration component included in the configuration requirement and the relationship are generated" means a configuration component and a relationship required to generate the configuration component included in the configuration requirement and the relationship out of respective configuration requirements from a starting configuration requirement to a configuration requirement before a change from which a four-piece set is to be extracted. For example, a configuration component "VM" is generated based on a configuration component "AP" included in a starting configuration requirement, and a configuration component "NW" is generated based on the configuration component "VM". The configuration component "NW" is included in a unit configuration requirement. In this case, both "AP" and "VM" correspond to configuration components from which the configuration component "NW" is generated. A specific example of the history information of unit configuration requirement will be described below.

Of the pieces of information included in a four-piece set extracted by the information extraction unit 12, the history information of unit configuration requirement may be information "none".

Described is a four-piece set extracted by the information extraction unit 12 from a change 53 from the configuration requirement 23 to the subsequent configuration requirement 24 illustrated in FIG. 9. FIG. 12 depicts a schematic diagram illustrating a four-piece set extracted from the change 53.

In the search history, the concretizing rule assigned to the change 53 is the concretizing rule B (refer to FIG. 10(*b*)). Therefore, the information extraction unit 12 extracts the concretizing rule B from the search history.

Also, the information extraction unit 12 determines that a unit configuration requirement in the configuration requirement 23 before the change includes configuration components 35 and 36 and a relationship "connectedTo" between the configuration components 35 and 36 based on the configuration requirements 23 and 24 and the concretizing rule B and extracts the unit configuration requirement from the configuration requirement 23. The extracted unit configuration requirement is illustrated in FIG. 12.

Subsequently, the information extraction unit 12 extracts neighbor information of the aforementioned unit configuration requirement from the configuration requirement 23. The extracted neighbor information of the unit configuration requirement is illustrated in FIG. 12.

Subsequently, the information extraction unit 12 extracts history information of unit configuration requirement including a concretizing rule used in connection with generation of the aforementioned unit configuration requirement and information indicating to which part of which configuration requirement the concretizing rule is applied. A unit configuration requirement is generated at the change 51 illustrated in FIG. 9. Therefore, the information extraction unit 12 extracts the concretizing rule A (refer to FIG. 10(*a*)) assigned to the change 51, the configuration requirement 21 to which the concretizing rule A is applied, and the part in the configuration requirement 21 to which the concretizing rule A is applied.

In a case in which there is at least one other concretizing rule used in connection with generation of the unit configuration requirement, the information extraction unit 12 extracts, per concretizing rule, the concretizing rule and information indicating to which part of which configuration requirement the concretizing rule is applied.

In the present example, the concretizing rule A assigned to the change 52 contributes to generation of configuration components 37 and 38 not included in the unit configuration requirement illustrated in FIG. 12(2) and a relationship between the configuration components 37 and 38 and does not contribute to generation of the unit configuration requirement illustrated in FIG. 12(2). Therefore, the concretizing rule A assigned to the change 52, a part in the configuration requirement 22 to which the concretizing rule A is applied, and the like are not included in the history information of unit configuration requirement.

The history information of unit configuration requirement extracted in the present example is illustrated in FIG. 12.

The information extraction unit 12 extracts a four-piece set for each change. In a case in which the change 51 illustrated in FIG. 9 is a target, the information extraction unit 12 extracts the following four-piece set.

(1) Concretizing Rule

The information extraction unit 12 extracts the "concretizing rule A".

(2) Unit Configuration Requirement

The information extraction unit 12 extracts the configuration components 31 and 32 included in the configuration requirement 21 and the relationship between the configuration components 31 and 32.

(3) Neighbor Information of Unit Configuration Requirement

In the present example, since there are no other configuration components connected to the configuration components 31 and 32 included in the unit configuration requirement, the neighbor information of the unit configuration requirement is the same as the unit configuration requirement.

(4) History Information of Unit Configuration Requirement

In the present example, the unit configuration requirement is included in the given configuration requirement 21. Therefore, there is no concretizing rule used in connection with generation of the unit configuration requirement. Accordingly, the information extraction unit 12 obtains information "none" as the history information of unit configuration requirement.

Also, in a case in which the change 52 illustrated in FIG. 9 is a target, the information extraction unit 12 extracts the following four-piece set.

(1) Concretizing Rule

The information extraction unit 12 extracts the "concretizing rule A".

(2) Unit Configuration Requirement

The information extraction unit 12 extracts the configuration components 33 and 34 included in the configuration requirement 22 and the relationship between the configuration components 33 and 34.

(3) Neighbor Information of Unit Configuration Requirement

In the present example, since there are no other configuration components connected to the configuration components 33 and 34 included in the unit configuration requirement, the neighbor information of the unit configuration requirement is the same as the unit configuration requirement.

(4) History Information of Unit Configuration Requirement

In the present example, the unit configuration requirement is included in the given configuration requirement 21. Therefore, there is no concretizing rule used in connection with generation of the unit configuration requirement. Accordingly, the information extraction unit 12 obtains information "none" as the history information of unit configuration requirement.

The respective four-piece sets obtained from the changes 53, 51, and 52 illustrated in FIG. 9 have been described above. The information extraction unit 12 extracts a four-piece set for each change of a configuration requirement in each search history stored in the search history storage unit 11.

Also, the information extraction unit 12 causes the respective extracted four-piece sets to be stored in the learning data storage unit 13. The learning data storage unit 13 is a storage device that stores a collection of four-piece sets.

The learning unit 14 uses, as learning data, a collection of four-piece sets stored in the learning data storage unit 13, to learn a calculation method for calculating a score indicating the degree of appropriateness of a concretizing rule included in the given four-piece set by means of machine learning. The learning unit 14 may use the technique described in NPL 4 in machine learning for the calculation method for calculating the score corresponding to the four-piece set.

Here, the method for calculating the score corresponding to a given four-piece set is referred to as a model. The model is determined in advance. In the present exemplary embodiment, described as an example is a case in which a method of, in a case in which four-piece sets are given, classifying sets of information each including three types of information (hereinbelow referred to as a three-piece set) other than the concretizing rule in the four-piece set into groups corresponding to the concretizing rules in accordance with the concretizing rules included in the four-piece sets and determining scores for the three-piece sets in each group is determined in advance as a model. However, another model (method) may be determined as the model.

Figure 13:
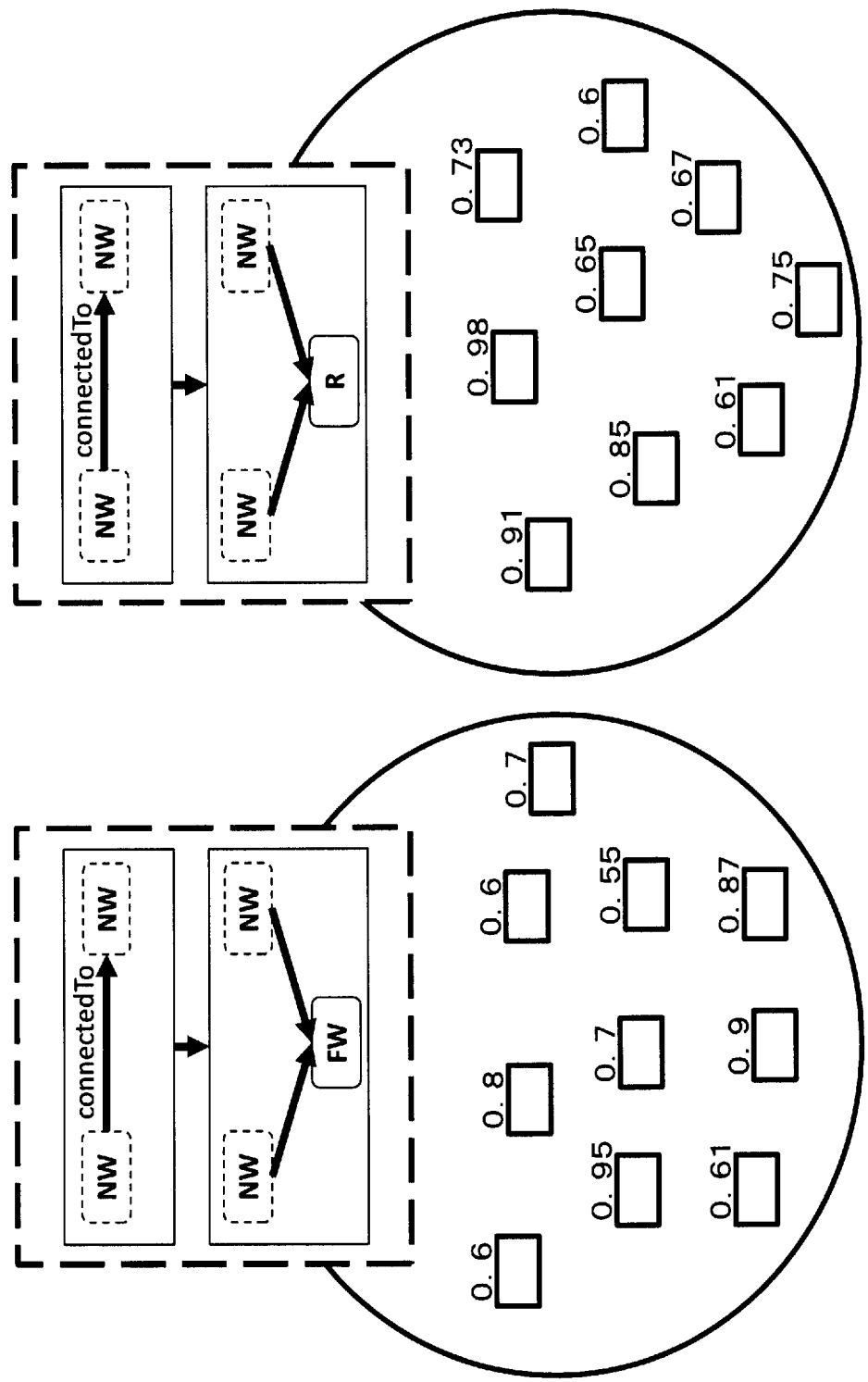
FIG. 13 It depicts a schematic diagram illustrating examples of scores determined for three-piece sets, included in various four-piece sets, classified into groups corresponding to concretizing rules in accordance with the concretizing rules.

FIG. 13 depicts a schematic diagram illustrating examples of scores determined for three-piece sets, included in various four-piece sets, classified into groups corresponding to concretizing rules in accordance with the concretizing rules. In FIG. 13, two groups corresponding to the concretizing rules are illustrated. Also, each rectangle illustrated in FIG. 13 schematically represents a three-piece set. The value illustrated in the vicinity of the rectangle indicates a score of the three-piece set classified into the group. Meanwhile, in the concretizing rules illustrated in FIG. 13, "FW" means a firewall, and "R" means a router.

The learning unit 14 uses a collection of four-piece sets as learning data to learn a calculation method for calculating a score based on the aforementioned model by means of machine learning. For example, the learning unit 14 learns a calculation method (for example, a calculation formula) for calculating a score for a three-piece set for each group corresponding to a concretizing rule.

In the above model, it can be said that, in a situation provided by a three-piece set, the score indicates the degree of appropriateness of the configuration requirement after the change in a case in which the concretizing rule corresponding to the group into which the three-piece set is classified is used.

The learning unit 14 causes a learning result (a calculation method for calculating a score indicating the degree of appropriateness of the concretizing rule included in a four-piece set in a case in which the four-piece set is given) to be stored in the learning result storage unit 15. The learning result storage unit 15 is a storage device that stores a learning result (score calculation method) by the learning unit 14.

The concretizing rule storage unit 16 is a storage device that stores a plurality of types of concretizing rule.

The input unit 17 is an input device into which a new configuration requirement is input.

The search unit 18 reads, from the concretizing rule storage unit 16, a concretizing rule applicable to a configuration requirement of interest. The number of the concretizing rules applicable to the configuration requirement of interest is not limited to one and may be two or more.

In a case in which a new configuration requirement is input into the input unit 17, the search unit 18 selects the new configuration requirement as a configuration requirement of interest. Also, as will be described below, the search unit 18 sequentially selects configuration requirements of interest.

The search unit 18 determines a pair including a concretizing rule read from the concretizing rule storage unit 16 and an application part of the concretizing rule in the configuration requirement of interest. In a case in which the same concretizing rule is applied to different application parts in the configuration requirement, configuration requirements obtained differ. Scores obtained also differ depending on the application part of the concretizing rule. Therefore, as described above, the search unit 18 determines each pair including a concretizing rule and an application part of the concretizing rule in the configuration requirement of interest.

Figure 14:
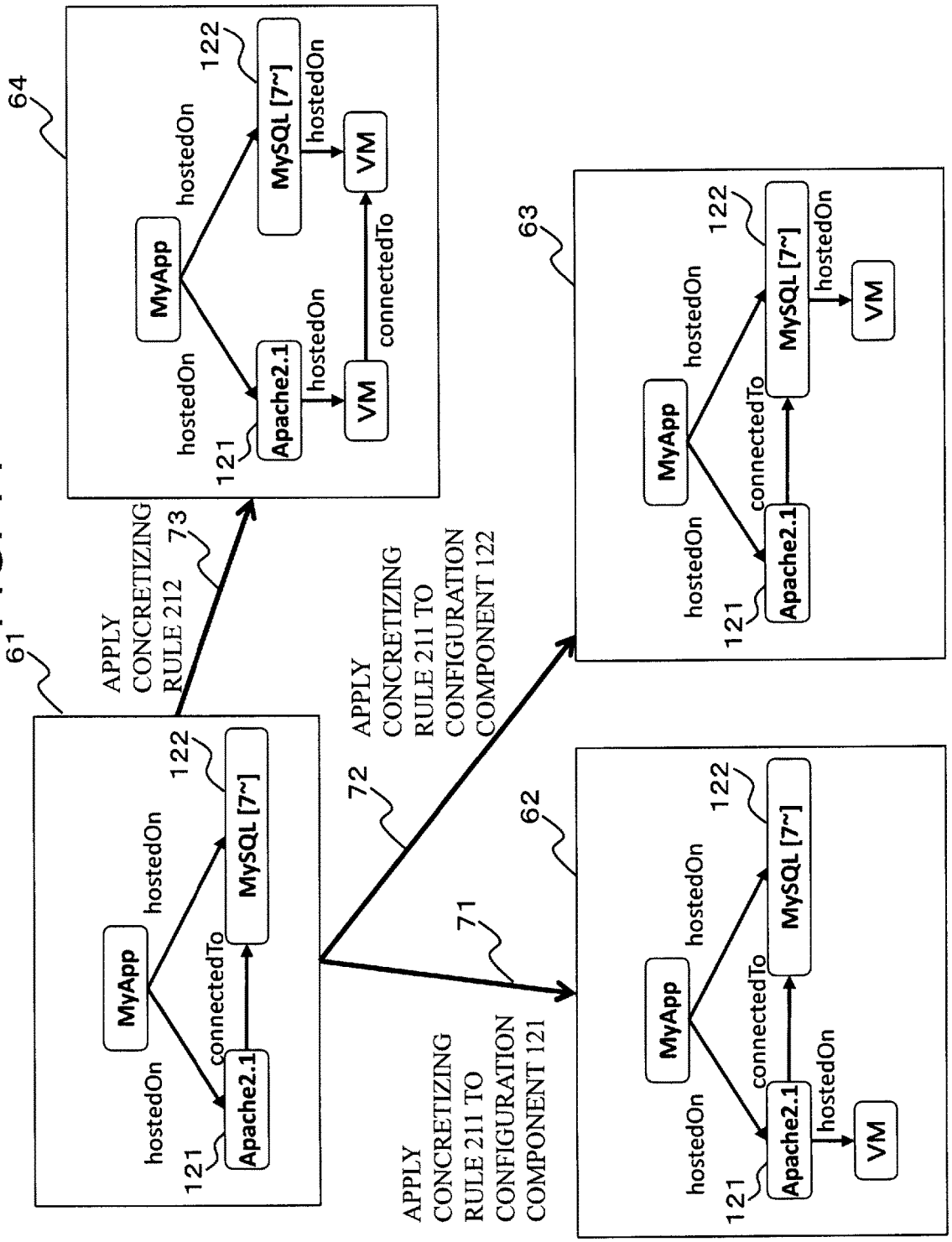
FIG. 14 It depicts a schematic diagram illustrating that different configuration requirements are obtained depending on the difference in a concretizing rule and the difference in an application part of the concretizing rule in a configuration requirement.

FIG. 14 depicts a schematic diagram illustrating that different configuration requirements are obtained depending on the difference in the concretizing rule and the difference in the application part of the concretizing rule in the configuration requirement. Here, a configuration requirement 61 illustrated in FIG. 14 is a configuration requirement input into the input unit 17, and the search unit 18 selects the configuration requirement 61 as a configuration requirement of interest. Also, the search unit 18 reads two concretizing rules 211 and 212 illustrated in FIG. 15 from the concretizing rule storage unit 16 as concretizing rules applicable to the configuration requirement 61.

Figure 15:
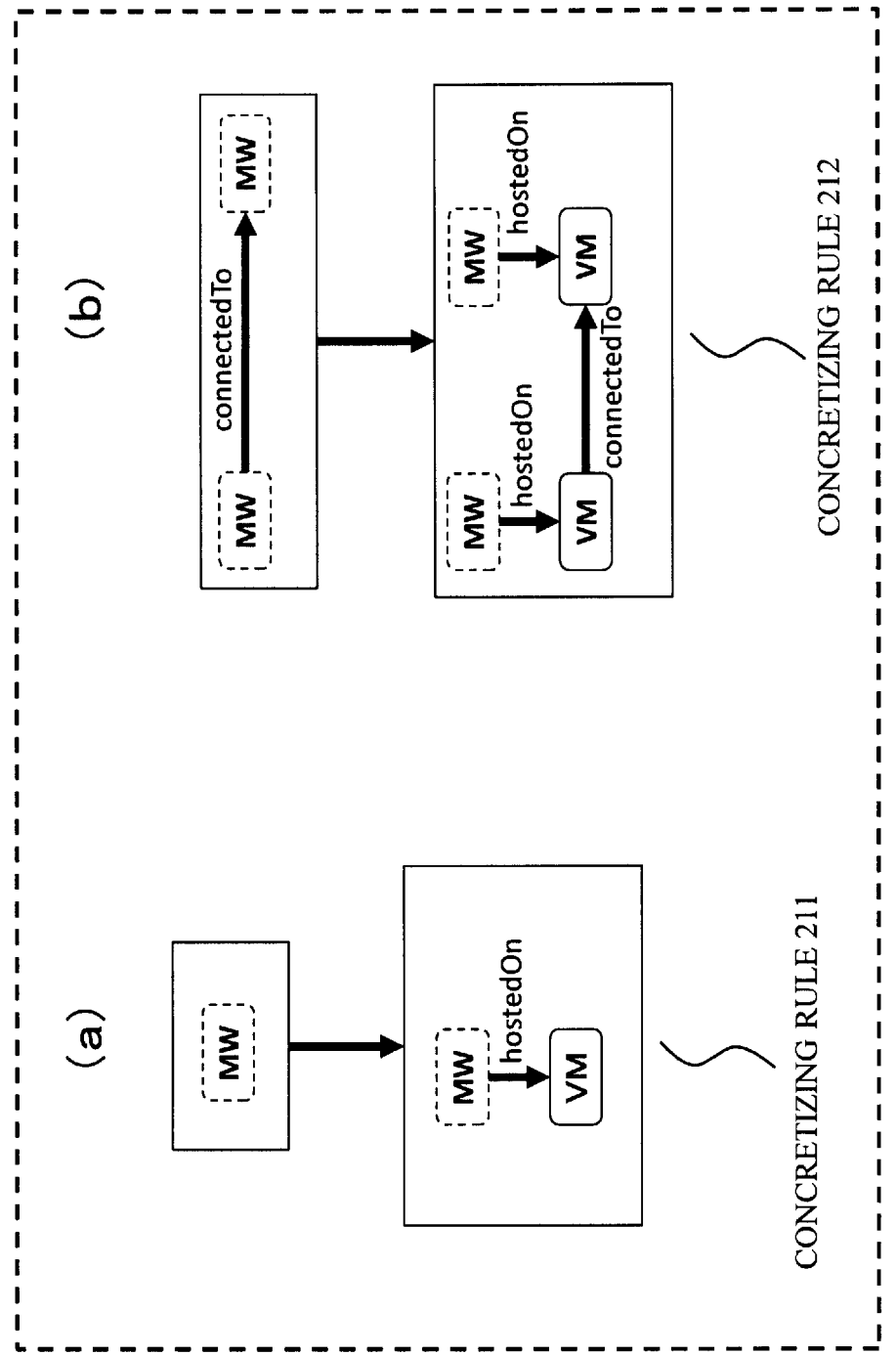
FIG. 15 It depicts a schematic diagram illustrating an example of a concretizing rule.

The concretizing rule 211 (refer to FIG. 15(*a*)) is applicable to configuration components 121 and 122 in the configuration requirement 61, respectively, and a configuration requirement obtained differs depending on which of the configuration components 121 and 122 the concretizing rule 211 is applied to. Also, the concretizing rule 212 (refer to FIG. 15(*b*)) is applicable to the configuration components 121 and 122 in the configuration requirement 61 and a part corresponding to a relationship for connecting the configuration components 121 and 122.

In a case in which the concretizing rule 211 is applied to the configuration component 121, a configuration requirement 62 (refer to FIG. 14) is obtained.

In a case in which the concretizing rule 211 is applied to the configuration component 122, a configuration requirement 63 (refer to FIG. 14) is obtained.

In a case in which the concretizing rule 212 is applied to the configuration components 121 and 122 and the part corresponding to the relationship for connecting the configuration components 121 and 122, a configuration requirement 64 (refer to FIG. 14) is obtained.

In the present example, the search unit 18 determines the following three pairs as a pair including a concretizing rule and an application part thereof.
(Pair 1) A pair including the concretizing rule 211 and the configuration component 121
(Pair 2) A pair including the concretizing rule 211 and the configuration component 122
(Pair 3) A pair including the concretizing rule 212 and "the configuration components 121 and 122 and the part corresponding to the relationship for connecting the configuration components 121 and 122"

The search unit 18 extracts the aforementioned four-piece set for each determined pair. The search unit 18 may extract the concretizing rule included in the pair as the concretizing rule in the four-piece set. Also, the search unit 18 may extract the application part included in the pair (application part of the concretizing rule) as the unit configuration requirement in the four-piece set. The search unit 18 then may determine the neighbor information of the unit configuration requirement and the history information of unit configuration requirement in accordance with the unit configuration requirement. The method by which the search unit 18 determines the neighbor information of the unit configuration requirement and the history information of unit configuration requirement is the same as the method by which the information extraction unit 12 determines the neighbor information of the unit configuration requirement and the history information of unit configuration requirement.

As in the case in which the information extraction unit 12 extracts the four-piece set, one or a plurality of constraint conditions for the neighbor information may be designated in advance. In this case, the search unit 18 extracts the four-piece set that includes the neighbor information that satisfies the constraint conditions.

The four-piece set extracted in accordance with the above "Pair 1" is assigned to a change 71 from the configuration requirement 61 to the configuration requirement 62. The four-piece set extracted in accordance with the above "Pair 2" is assigned to a change 72 from the configuration requirement 61 to the configuration requirement 63. The four-piece set extracted in accordance with the above "Pair 3" is assigned to a change 73 from the configuration requirement 61 to the configuration requirement 64.

Further, the search unit 18 applies the four-piece set to the score calculation method for each determined pair to calculate a score of the four-piece set. The score calculation method is learned by the learning unit 14 as described above and is stored in the learning result storage unit 15.

The search unit 18 selects the four-piece set having the highest score among the four-piece sets extracted for the respective pairs and the four-piece sets that have been scored by the search unit 18 before (in other words, before the present score calculation) and that have not been selected.

However, in a case in which there are no four-piece sets that have been scored by the search unit 18 before and have not been selected, the search unit 18 may select the four-piece set having the highest score among the four-piece sets extracted for the respective pairs. In the example illustrated in FIG. 14, the configuration requirement 61 is a newly input configuration requirement. Therefore, in the example illustrated in FIG. 14, there are no four-piece sets that have been scored by the search unit 18 before and have not been selected. Accordingly, the search unit 18 may select the four-piece set having the highest score among the three four-piece sets.

The search unit 18 newly selects, as a configuration requirement of interest, a configuration requirement obtained by applying, to a configuration requirement to which the pair corresponding to the selected four-piece set is to be applied, the pair.

Figure 16:
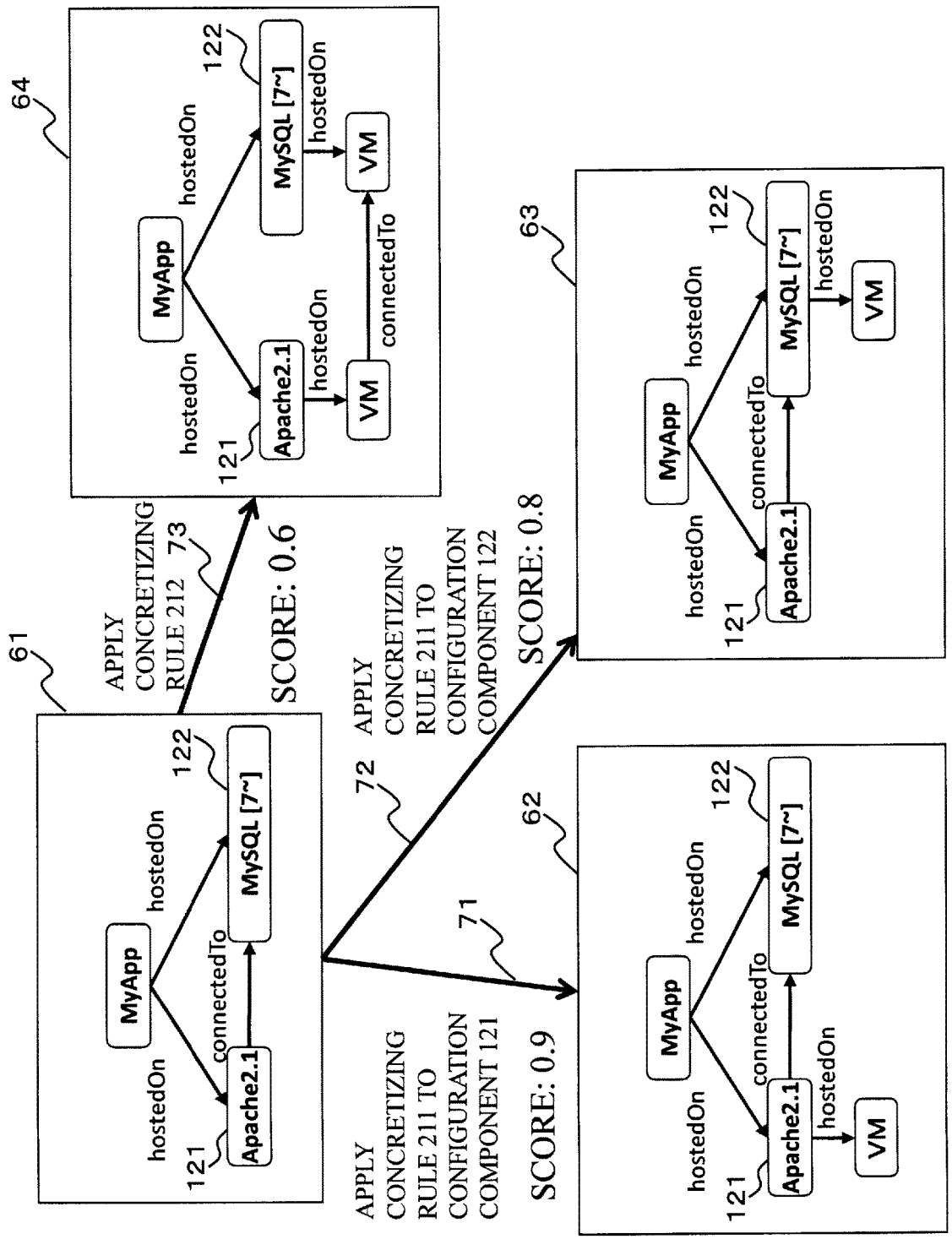
FIG. 16 It depicts a schematic diagram illustrating examples of calculated scores.

For example, the score of the four-piece set corresponding to the above "Pair 1" is "0.9", the score of the four-piece set corresponding to the above "Pair 2" is "0.8", and the score of the four-piece set corresponding to the above "Pair 3" is "0.6" (refer to FIG. 16). In this case, the score of the four-piece set corresponding to the above "Pair 1" is the highest. The configuration requirement to which the "Pair 1" corresponding to the four-piece set having the highest score is to be applied is the configuration requirement 61. Therefore, the search unit 18 newly selects the configuration requirement 62 obtained by applying the "Pair 1" to the configuration requirement 61 as the configuration requirement of interest.

In the present example, the configuration requirement 61 is a new configuration requirement, and the application targets of the above "Pair 1", "Pair 2", and "Pair 3" are all the configuration requirement 61. Therefore, the configuration requirement to which the pair (Pair 1) corresponding to the four-piece set having the highest score is to be applied corresponds to the configuration requirement of interest. However, when the search progresses, the configuration requirement to which the pair corresponding to the four-piece set having the highest score is to be applied may not correspond to the configuration requirement of interest.

When the search unit 18 newly selects the configuration requirement of interest, the search unit 18 repeats similar operation. Therefore, the search unit 18 sequentially selects the configuration requirement of interest.

Also, in the above operation, the search unit 18 causes the configuration requirement of interest, the respective pairs determined for the configuration requirement of interest, the four-piece sets extracted for the respective pairs, the scores calculated for the respective pairs (scores for the four-piece sets), and the newly selected configuration requirement as the configuration requirement of interest to be stored in the search progress storage unit 19. The search progress storage unit 19 is a storage device that stores these pieces of information. By storing the above various types of information in the search progress storage unit 19, the search unit 18 can extract the history information of unit configuration requirement included in each four-piece set even when the search for the configuration requirements progresses.

In a case in which the search unit 18 newly selects the configuration requirement 62 as the configuration requirement of interest, the search unit 18 reads, from the concretizing rule storage unit 16, a concretizing rule applicable to the configuration requirement 62. The search unit 18 then determines a pair including the read concretizing rule and an application part of the concretizing rule in the configuration requirement 62.

The search unit 18 then extracts the aforementioned four-piece set for each determined pair. The search unit 18 further calculates a score for the four-piece set for each determined pair.

The search unit 18 selects the four-piece set having the highest score among the four-piece sets extracted for the respective pairs and the four-piece sets that have been scored by the search unit 18 before and that have not been selected. Here, as the four-piece sets that have been scored by the search unit 18 before and that have not been selected, the four-piece set that has been scored "0.8" (refer to FIG. 16) and the four-piece set that has been scored "0.6" (refer to FIG. 16) exist. Therefore, the search unit 18 selects the highest score among the respective scores calculated this time and the scores "0.8" and "0.6" calculated before and selects the four-piece set having the highest score. In the present example, two four-piece sets are obtained based on the configuration requirement of interest, and the scores of the two four-piece sets are "0.5" and "0.4". In this case, the highest score is the score "0.8" calculated before (refer to FIG. 16). The pair corresponding to the four-piece set having the highest score is the above "Pair 2". The configuration requirement to which the "Pair 2" is to be applied is the configuration requirement 61. Therefore, the search unit 18 newly selects the configuration requirement 63 obtained by applying the "Pair 2" to the configuration requirement 61 as the configuration requirement of interest. In the present example, the configuration requirement to which the pair corresponding to the four-piece set having the highest score is to be applied does not correspond to the configuration requirement of interest (configuration requirement 62).

When the search unit 18 newly selects the configuration requirement of interest, the search unit 18 repeats similar operation.

In the above example, a case in which the "configuration requirement 61", the "configuration requirement 62", and the "configuration requirement 63" are sequentially selected as the configuration requirements of interest has been illustrated. Depending on the value of the obtained score, a configuration requirement lower than the configuration requirement 62 may be selected as the configuration requirement of interest subsequent to the configuration requirement 62, for example.

Meanwhile, in a case in which the configuration requirement newly selected as the configuration requirement of interest cannot be concretized further in detail, the search unit 18 ends the search and determines the configuration requirement as a configuration requirement corresponding to a leaf node in a tree structure.

The information extraction unit 12, the learning unit 14, and the search unit 18 are executed by, for example, a central processing unit (CPU) of a computer that operates in accordance with a system configuration derivation program. In this case, the CPU may read a system configuration derivation program from a program recording medium such as a program storage unit of the computer and operate as the information extraction unit 12, the learning unit 14, and the search unit 18 in accordance with the system configuration derivation program.

Also, the system configuration derivation device 10 may have a configuration in which two or more physically separated devices are connected by wire or wirelessly.

Next, a processing progress according to the present invention will be described. Note that description of the matters described above is omitted as needed.

Figure 17:
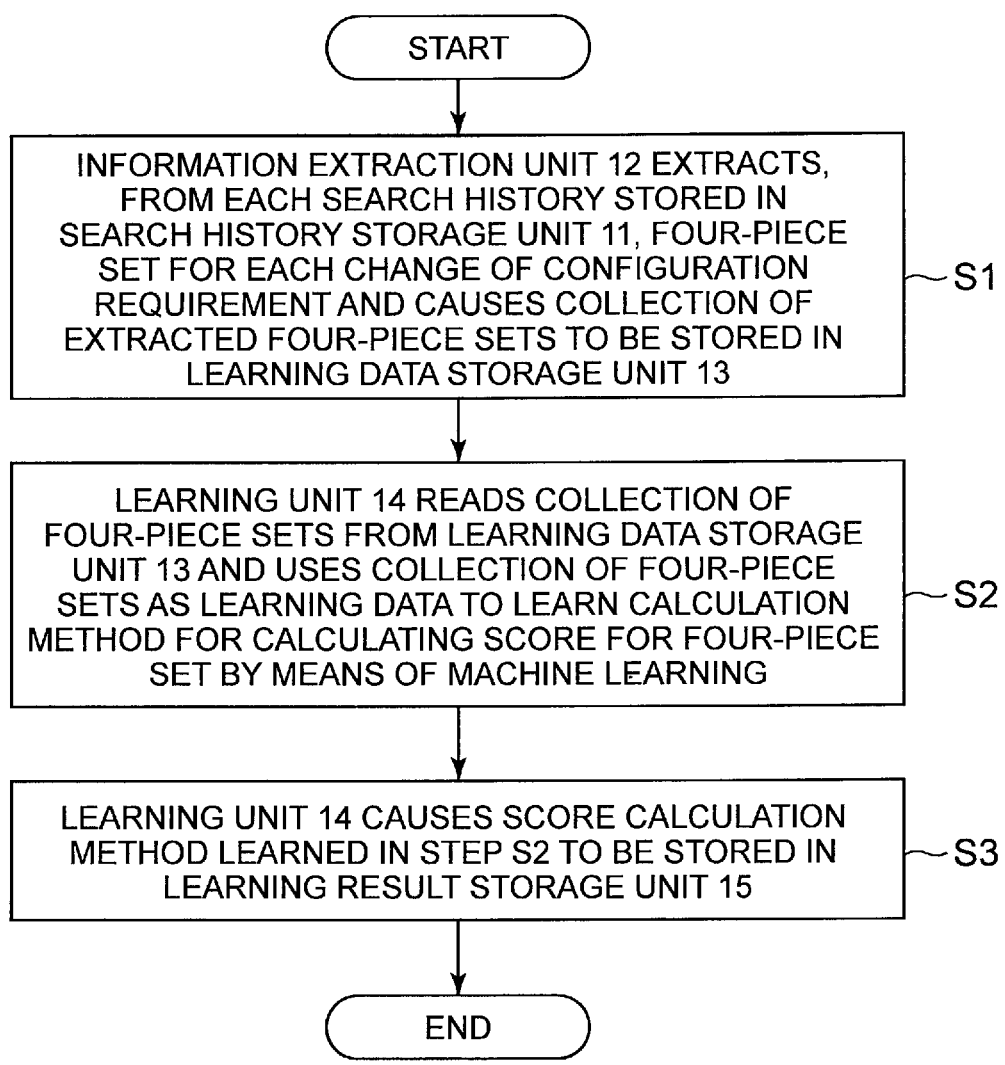
FIG. 17 It depicts a flowchart illustrating an example of a processing progress at the time of learning a score calculation method.

FIG. 17 depicts a flowchart illustrating an example of a processing progress at the time of learning the score calculation method. First, the information extraction unit 12 extracts, from each search history stored in the search history storage unit 11, a four-piece set for each change of a configuration requirement and causes a collection of the extracted four-piece sets to be stored in the learning data storage unit 13 (step S1).

Subsequently, the learning unit 14 reads the collection of the four-piece sets from the learning data storage unit 13. The learning unit 14 uses the collection of four-piece sets as learning data to learn a calculation method for calculating a score for four-piece set (for example, a calculation formula) by means of machine learning (step S2).

The learning unit 14 causes the score calculation method learned in step S2 to be stored in the learning result storage unit 15 (step S3).

Figure 18:
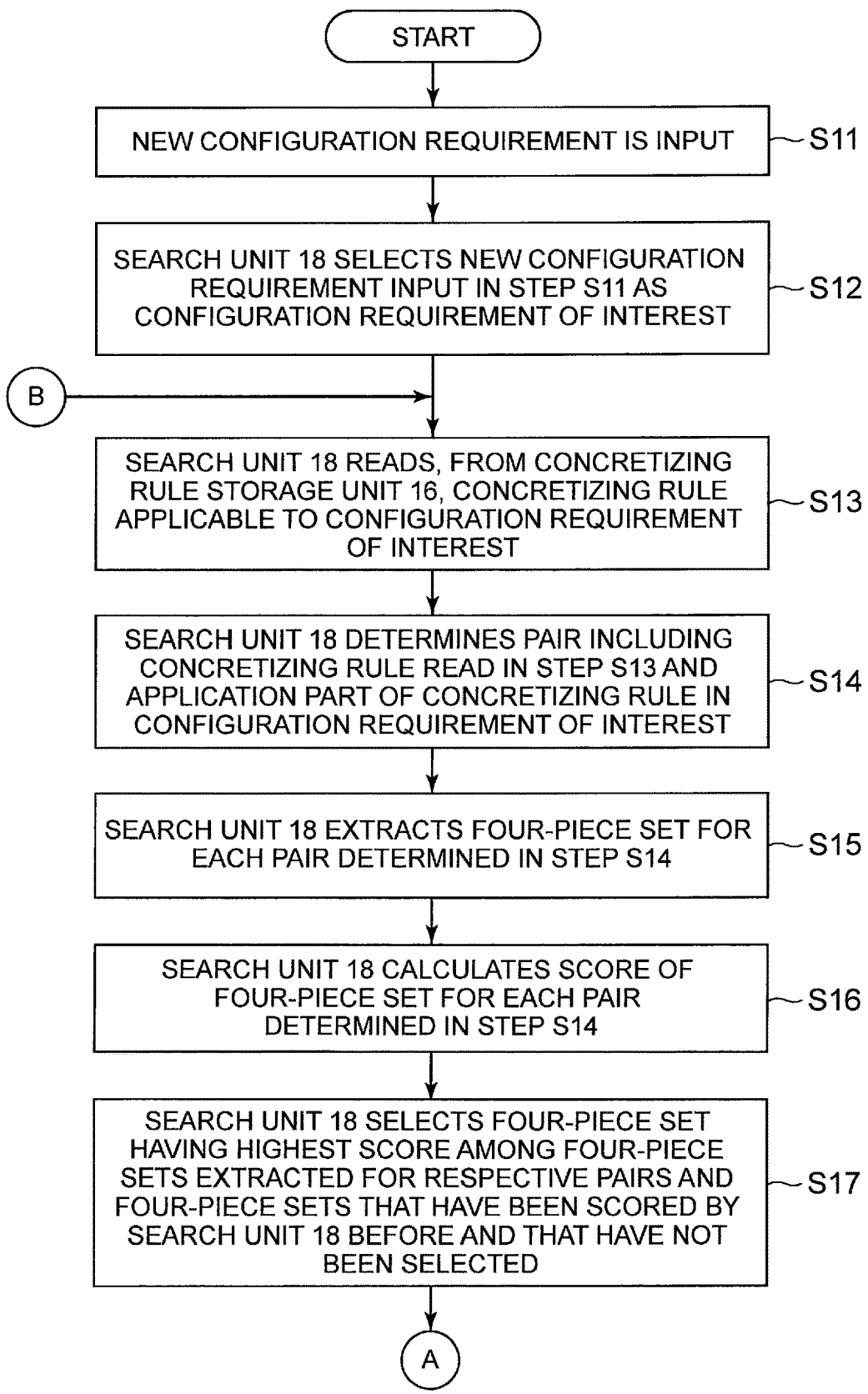
FIG. 18 It depicts a flowchart illustrating an example of a processing progress for searching a configuration requirement to further concretize an input configuration requirement serving as a starting point.
Figure 19:
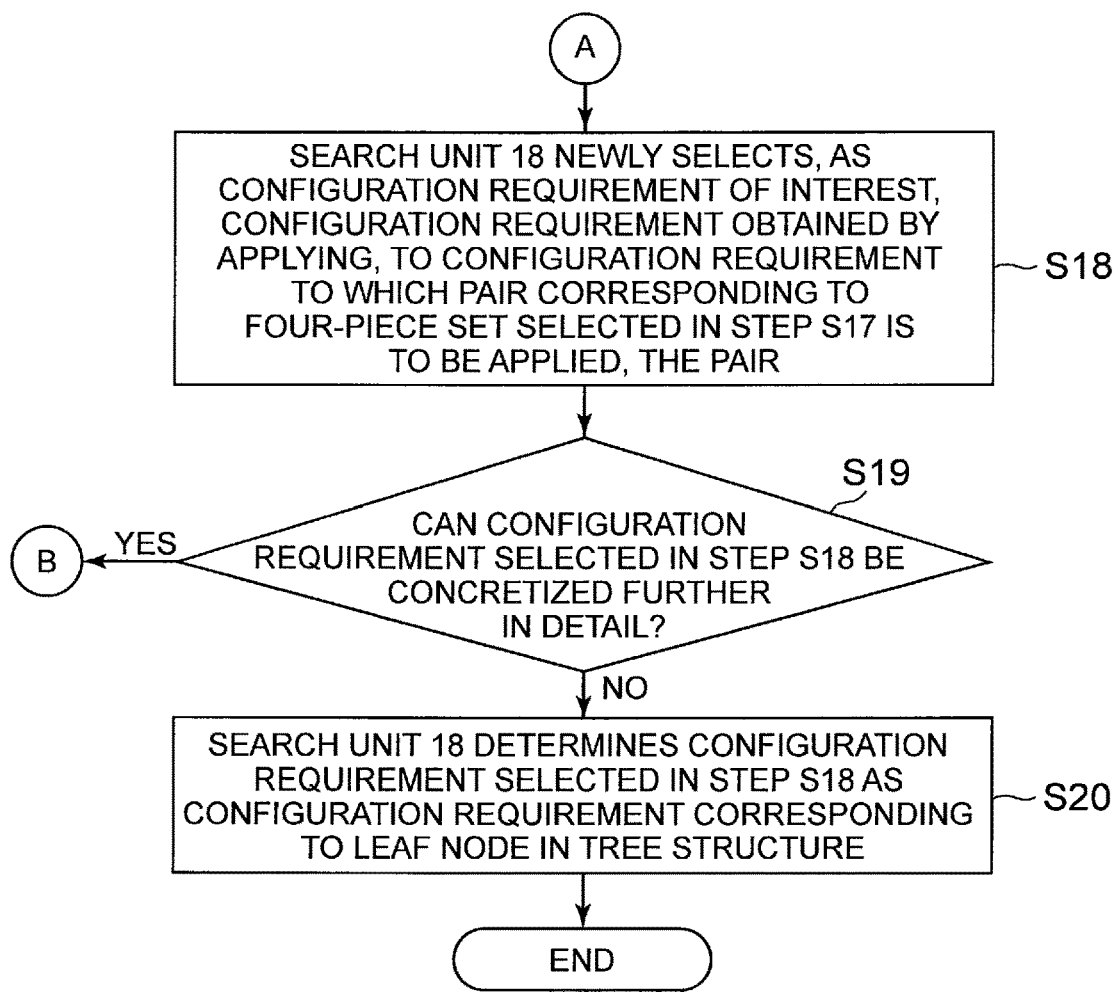
FIG. 19 It depicts a flowchart illustrating the example of the processing progress for searching a configuration requirement to further concretize an input configuration requirement serving as a starting point.

FIGS. 18 and 19 depict flowcharts illustrating an example of a processing progress for searching a configuration requirement to further concretize an input configuration requirement serving as a starting point.

First, a new configuration requirement is input via the input unit 17 (step S11).

The search unit 18 selects the new configuration requirement input in step S11 as a configuration requirement of interest (step S12).

Meanwhile, the search unit 18 causes this configuration requirement to be stored in the search progress storage unit 19 as the configuration requirement of interest. The information stored in the search progress storage unit 19 is used when the history information of unit configuration requirement included in the four-piece set is extracted.

Subsequently, the search unit 18 reads, from the concretizing rule storage unit 16, a concretizing rule applicable to the configuration requirement of interest (step S13).

Subsequently, the search unit 18 determines a pair including the concretizing rule read in step S13 and an application part of the concrete rule in the configuration requirement of interest (step S14). A plurality of pairs may be obtained in step S14.

The search unit 18 associates each of the pairs with the configuration requirement of interest and causes the pairs to be stored in the search progress storage unit 19.

Subsequently, the search unit 18 extracts a four-piece set for each pair determined in step S14 (step S15).

Further, the search unit 18 applies the four-piece set to the score calculation method for each pair determined in step S14 to calculate a score of the four-piece set (step S16).

The search unit 18 associates the four-piece set and the score with the pair and causes the four-piece set and the score to be stored in the search progress storage unit 19.

Subsequently, the search unit 18 selects the four-piece set having the highest score among the four-piece sets extracted for the respective pairs in the previous step S15 and the four-piece sets that have been scored by the search unit 18 before and that have not been selected (step S17). However, in a case in which there are no four-piece sets that have been scored by the search unit 18 before and have not been selected, the search unit 18 may select the four-piece set having the highest score among the four-piece sets extracted for the respective pairs in the previous step S15.

Subsequently, the search unit 18 newly selects, as a configuration requirement of interest, a configuration requirement obtained by applying, to the configuration requirement to which the pair corresponding to the four-piece set selected in step S17 is to be applied, the pair (step S18). The search unit 18 causes the configuration requirement to be stored in the search progress storage unit 19 as a "configuration requirement of interest" selected subsequently.

Subsequently, the search unit 18 determines whether or not the configuration requirement selected in step S18 can be concretized further in detail (step S19). For example, the search unit 18 may determine that the configuration requirement can be concretized further in detail in a case in which a concretizing rule applicable to the configuration requirement selected in step S18 is stored in the concretizing rule storage unit 16 and determine that the configuration requirement cannot be concretized further in detail in a case in which a concretizing rule applicable to the configuration requirement is not stored in the concretizing rule storage unit 16. However, this determination method is illustrative, and the determination method in step S19 is not particularly limited.

In a case in which the search unit 18 determines that the configuration requirement selected in step S18 can be concretized further (Yes in step S19), the search unit 18 repeats the operations in step S13 and the subsequent steps.

In a case in which the search unit 18 determines that the configuration requirement selected in step S18 cannot be concretized further (No in step S19), the search unit 18 determines the configuration requirement selected in step S18 as a configuration requirement corresponding to a leaf node in a tree structure (step S20). Meanwhile, the search unit 18 causes the configuration requirement to be stored in the search progress storage unit 19 as a configuration requirement obtained finally. The search unit 18 ends the processing in step S20.

It can be said that, in the above processing progress, the system configuration derivation device 10 concretizes the configuration requirement of the system to be constructed by repeating update of the configuration requirement.

The designer of the ICT system can use the configuration requirement corresponding to the leaf node for construction of the ICT system.

According to the present exemplary embodiment, the learning unit 14 uses a collection of four-piece sets obtained from a past search history for configuration requirements as learning data to learn a calculation method for calculating a score for each four-piece set (for example, a calculation formula). The granularity of the "unit configuration requirement" included in the four-piece set is finer than that of the "configuration requirement". Therefore, at the time of learning the score calculation method, the similarity of the "unit configuration requirement" is easy to obtain, and a highly accurate score calculation method can be learned.

In addition, the four-piece set includes the neighbor information of the unit configuration requirement. Whether or not pieces of neighbor information are similar to each other can be determined by whether or not one piece of neighbor information can be graph-embedded in the other piece of neighbor information, for example. Whether or not pieces of neighbor information are similar to each other can be determined, and a highly accurate score calculation method can be learned.

In addition, the four-piece set includes the history information of unit configuration requirement. Therefore, a score calculation method in which a score is obtained as a value considering a design intention can be learned.

The search unit 18 applies such a score calculation method to a four-piece set to calculate a score for the four-piece set and proceeds with a search for a configuration requirement based on the score. Therefore, according to the present exemplary embodiment, a favorable configuration requirement can be searched efficiently with use of a past search history for configuration requirements.

Thus, according to the present exemplary embodiment, in constructing a system, a configuration of the system can be derived efficiently.

Next, modification examples of the above exemplary embodiment will be described. In the above exemplary embodiment, information indicating a unit configuration requirement, a configuration component residing and a relationship between configuration components within N hops from the unit configuration requirement is referred to as "neighbor information of the unit configuration requirement".

The neighbor information of the unit configuration requirement is not limited to the above example. For example, the neighbor information of the unit configuration requirement may be information indicating the number of configuration components residing within N hops from the unit configuration requirement.

The value of N in the N hops is N=1, for example, but is not limited to N=1, and may be N=2, N=3, or the like. This respect is similar to that in the above exemplary embodiment.

Also, one or a plurality of constraint conditions for neighbor information may be designated in advance. In this case, the information extraction unit 12 may regard as the neighbor information the number of configuration components that satisfy the constraint conditions among configuration components residing within N hops (for example, one hop) from the unit configuration requirement. For example, a specific type of the configuration component is designated as the constraint condition. In this case, the information extraction unit 12 may regard as the neighbor information the number of configuration components that match the type among configuration components residing within N hops (for example, one hop) from the unit configuration requirement.

Figure 20:
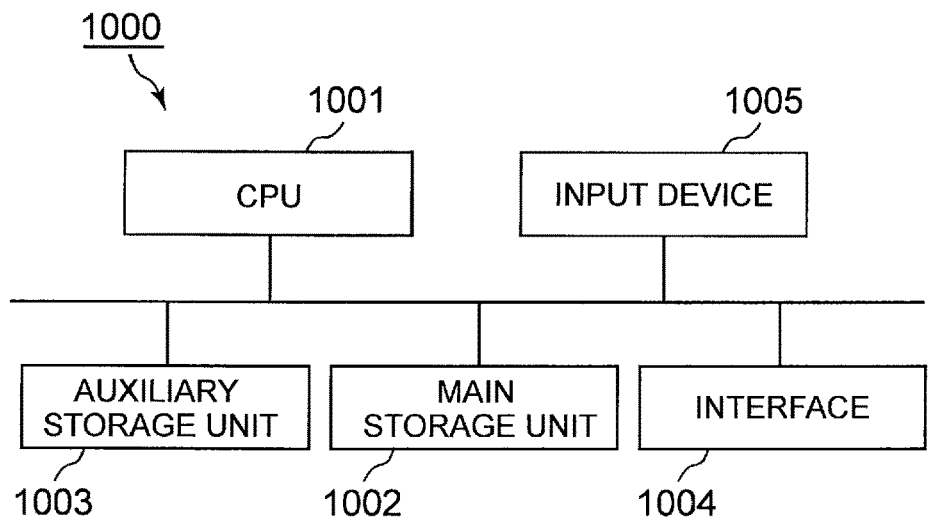
FIG. 20 It depicts a schematic block diagram illustrating a configuration example of a computer according to an exemplary embodiment of the present invention.

FIG. 20 depicts a schematic block diagram illustrating a configuration example of a computer according to the exemplary embodiment of the present invention. The following description also applies to a second exemplary embodiment described below. A computer 1000 includes a CPU 1001, a main storage unit 1002, an auxiliary storage unit 1003, an interface 1004, and an input device 1005.

The system configuration derivation device 10 according to the exemplary embodiment of the present invention is installed in the computer 1000. Operations of the system configuration derivation device 10 are stored in the auxiliary storage unit 1003 in the form of the system configuration derivation program. The CPU 1001 reads out the system configuration derivation program from the auxiliary storage unit 1003, expands the program on the main storage unit 1002, and executes the processing described in the aforementioned exemplary embodiment in accordance with the system configuration derivation program.

The auxiliary storage unit 1003 is an example of a not-temporary tangible medium. Other examples of the not-temporary tangible medium are a magnetic disk, a magneto-optical disk, a compact disk read only memory (CD-ROM), a digital versatile disk read only memory (DVD-ROM), and a semiconductor memory connected via the interface 1004. Also, in a case in which the program is delivered to the computer 1000 via communication lines, the computer 1000 may receive the program, expand the program on the main storage unit 1002, and execute the above processing.

Also, a part or all of each configuration component may be executed by general-purpose or dedicated circuitry, processor, or a combination thereof. The circuitry, processor, or the combination thereof may include a single chip or a plurality of chips connected via a bus. Also, a part or all of each configuration component may be executed by a combination of the aforementioned circuitry or the like and a program.

In a case in which a part or all of each configuration component is executed by a plurality of information processing devices, circuits, and the like, the plurality of information processing devices, circuits, and the like may be provided in a focused or distributed manner. For example, the information processing devices, circuits, and the like may be executed in a manner in which the respective units are connected via a communication network, such as a client-and-server system and a cloud computing system.

Second Exemplary Embodiment

Figure 21:
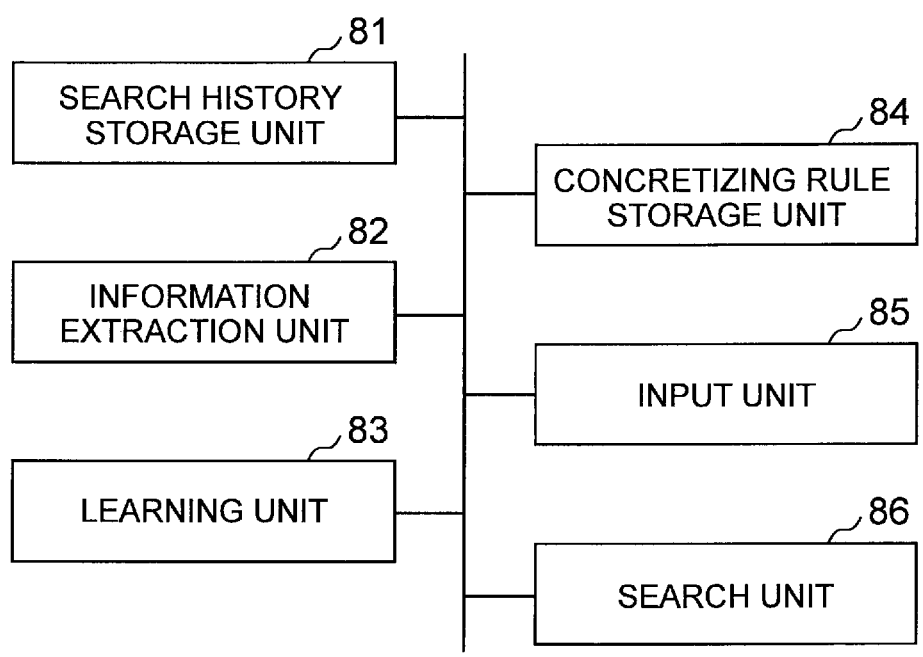
FIG. 21 It depicts a block diagram illustrating an example of a system configuration derivation device according to a second exemplary embodiment of the present invention.

FIG. 21 depicts a block diagram illustrating an example of a system configuration derivation device according to a second exemplary embodiment of the present invention. The system configuration derivation device according to the present exemplary embodiment can derive a concrete configuration requirement as a configuration requirement of a system to be constructed. More specifically, the system configuration derivation device concretizes a configuration requirement of a system to be constructed by repeating update of the configuration requirement of the system to be constructed. A system configuration derivation device according to the present invention includes a search history storage unit 81, an information extraction unit 82, a learning unit 83, a concretizing rule storage unit 84, an input unit 85, and a search unit 86.

The search history storage unit 81 (for example, corresponding to the search history storage unit 11 in the aforementioned first exemplary embodiment) stores a search history for configuration requirements determined to be appropriate previously.

The information extraction unit 82 (for example, corresponding to the information extraction unit 12 in the aforementioned first exemplary embodiment) extracts, for each change from one configuration requirement into a subsequent configuration requirement, a set including pieces of predetermined information including a concretizing rule applied to the one configuration requirement (for example, corresponding to the four-piece set in the aforementioned first exemplary embodiment) from the search history. The concretizing rule is a rule in which a part of a configuration requirement is rewritten so as to be described further in detail.

The learning unit 83 (for example, corresponding to the learning unit 14 in the aforementioned first exemplary embodiment) uses, as learning data, a collection of the sets including the pieces of predetermined information extracted by the information extraction unit 82 to learn a calculation method for calculating a score indicating the degree of appropriateness of a concretizing rule included in the set including the pieces of predetermined information.

The concretizing rule storage unit 84 (for example, corresponding to the concretizing rule storage unit 16 in the aforementioned first exemplary embodiment) stores a plurality of concretizing rules.

The input unit 85 (for example, corresponding to the input unit 17 in the aforementioned first exemplary embodiment) is supplied with a new configuration requirement.

The search unit 86 (for example, corresponding to the search unit 18 in the aforementioned first exemplary embodiment) repeats reading, from the concretizing rule storage unit 84, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to a calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair.

In a case in which a new configuration requirement is input into the input unit 85, the search unit 86 selects the new configuration requirement as a configuration requirement of interest.

Also, in a case in which there are no sets including the pieces of predetermined information that have been scored before and have not been selected, the search unit 86 selects the set including the pieces of predetermined information having the highest score among the sets including the pieces of predetermined information extracted for the respective pairs.

According to the present invention, in constructing a system, a configuration of the system can be derived efficiently.

Also, available is a configuration in which
the information extraction unit 82 extracts,
for each change from one configuration requirement into a subsequent configuration requirement,
a four-piece set including
a concretizing rule,
a unit configuration requirement serving as a part, in a configuration requirement to which the concretizing rule is applied, rewritten based on the concretizing rule,
neighbor information serving as information about the neighborhood of the unit configuration requirement, and
history information of unit configuration requirement including the concretizing rule used in connection with generation of the unit configuration requirement and information indicating to which part of which configuration requirement the concretizing rule is applied, in which
the learning unit 83 uses a collection of the four-piece sets as learning data to learn the calculation method, and in which the search unit 86 reads, from the concretizing rule storage unit 84, a concretizing rule applicable to a configuration requirement of interest and extracts the four-piece set for each pair.

Also, the neighbor information may be information indicating a unit configuration requirement, a configuration component and a relationship between configuration components residing within N hops from the unit configuration requirement.

Also, the neighbor information may be information indicating a unit configuration requirement and a configuration component and a relationship between configuration components residing within N hops from the unit configuration requirement, which are a configuration component that satisfies a designated condition and a relationship between configuration components.

Also, a name of a type may be described for the configuration component and the relationship between the configuration components included in the neighbor information.

Also, the neighbor information may be information indicating the number of configuration components residing within N hops from the unit configuration requirement.

Also, the neighbor information may be information indicating the number of configuration components residing within N hops from the unit configuration requirement and satisfying a designated condition.

Also, N=1 may be established.

Although the present invention has been described above with reference to the exemplary embodiments, the present invention is not limited to the above exemplary embodiments. The configurations and the details of the present invention can be altered in various ways so as to be understandable by those skilled in the art within the scope of the present invention.

The present application is based on and claims priority to Japanese Patent Application No. 2018-118930, filed on Jun. 22, 2018, the entire disclosure of which is hereby incorporated herein.

REFERENCE SIGNS LIST

10 System configuration derivation device
11 Search history storage unit
12 Information extraction unit
13 Learning data storage unit
14 Learning unit
15 Learning result storage unit
16 Concretizing rule storage unit
17 Input unit
18 Search unit
19 Search progress storage unit

What is claimed is:

1. A system configuration derivation device that repeats update of a configuration requirement of a system to be constructed to concretize the configuration requirement of the system to be constructed, comprising:
 a search history storage unit that stores a search history for a configuration requirement determined to be appropriate previously;
 an information extraction unit that extracts, for each change from one configuration requirement into a subsequent configuration requirement, a set including pieces of predetermined information including a concretizing rule applied to the one configuration requirement from the search history, the concretizing rule being a rule in which a part of a configuration requirement is rewritten so as to be described further in detail;
 a learning unit that uses, as learning data, a collection of the sets including the pieces of predetermined information extracted by the information extraction unit to learn a calculation method for calculating a score indicating a degree of appropriateness of a concretizing rule included in the set including the pieces of predetermined information;
 a concretizing rule storage unit that stores a plurality of concretizing rules;
 an input unit into which a new configuration requirement is input; and
 a search unit that repeats reading, from the concretizing rule storage unit, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair,
 wherein, in a case in which the new configuration requirement is input into the input unit, the search unit selects the new configuration requirement as a configuration requirement of interest, and
 wherein, in a case in which there are no sets including the pieces of predetermined information that have been scored before and have not been selected, the search unit selects the set including the pieces of predetermined information having the highest score among the sets including the pieces of predetermined information extracted for the respective pairs.

2. The system configuration derivation device according to claim 1,
 wherein the information extraction unit extracts,
 for the each change from the one configuration requirement into the subsequent configuration requirement,
 a four-piece set including
 a concretizing rule,
 a unit configuration requirement serving as a part, in a configuration requirement to which the concretizing rule is applied, rewritten based on the concretizing rule,
 neighbor information serving as information about neighborhood of the unit configuration requirement, and
 history information of unit configuration requirement including the concretizing rule used in connection with generation of the unit configuration requirement and information indicating to which part of which configuration requirement the concretizing rule is applied,
 wherein the learning unit uses a collection of the four-piece sets as learning data to learn the calculation method, and
 wherein the search unit reads, from the concretizing rule storage unit, a concretizing rule applicable to a configuration requirement of interest and extracts the four-piece set for the each pair.

3. The system configuration derivation device according to claim 2,
wherein the neighbor information is information indicating the unit configuration requirement, a configuration component and a relationship between configuration components residing within N hops from the unit configuration requirement.

4. The system configuration derivation device according to claim 3,
wherein a name of a type is described for the configuration component and the relationship between the configuration components included in the neighbor information.

5. The system configuration derivation device according to claim 3,
wherein N=1 is established.

6. The system configuration derivation device according to claim 2,
wherein the neighbor information is information indicating the unit configuration requirement and a configuration component and a relationship between configuration components residing within N hops from the unit configuration requirement, which are a configuration component that satisfies a designated condition and a relationship between configuration components.

7. The system configuration derivation device according to claim 2,
wherein the neighbor information is information indicating the number of configuration components residing within N hops from the unit configuration requirement.

8. The system configuration derivation device according to claim 2,
wherein the neighbor information is information indicating the number of configuration components residing within N hops from the unit configuration requirement and satisfying a designated condition.

9. A system configuration derivation method for repeating update of a configuration requirement of a system to be constructed to concretize the configuration requirement of the system to be constructed, comprising:
extracting, for each change from one configuration requirement into a subsequent configuration requirement, a set including pieces of predetermined information including a concretizing rule applied to the one configuration requirement from a search history for a configuration requirement determined to be appropriate previously, the concretizing rule being a rule in which a part of a configuration requirement is rewritten so as to be described further in detail;
using, as learning data, a collection of the extracted sets including the pieces of predetermined information to learn a calculation method for calculating a score indicating a degree of appropriateness of a concretizing rule included in the set including the pieces of predetermined information;
repeating reading, from a concretizing rule storage unit that stores a plurality of concretizing rules, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair;
in a case in which a new configuration requirement is input, selecting the new configuration requirement as a configuration requirement of interest; and
in a case in which there are no sets including the pieces of predetermined information that have been scored before and have not been selected, selecting the set including the pieces of predetermined information having the highest score among the sets including the pieces of predetermined information extracted for the respective pairs.

10. A non-transitory computer-readable recording medium having recorded therein a system configuration derivation program that causes a computer to repeat update of a configuration requirement of a system to be constructed to concretize the configuration requirement of the system to be constructed,
the non-transitory computer-readable recording medium having recorded therein the system configuration derivation program that causes the computer to execute:
information extraction processing for extracting, for each change from one configuration requirement into a subsequent configuration requirement, a set including pieces of predetermined information including a concretizing rule applied to the one configuration requirement from a search history for a configuration requirement determined to be appropriate previously, the concretizing rule being a rule in which a part of a configuration requirement is rewritten so as to be described further in detail;
learning processing for using, as learning data, a collection of the sets including the pieces of predetermined information extracted in the information extraction processing to learn a calculation method for calculating a score indicating a degree of appropriateness of a concretizing rule included in the set including the pieces of predetermined information; and
search processing for repeating reading, from a concretizing rule storage unit that stores a plurality of concretizing rules, a concretizing rule applicable to a configuration requirement of interest, extracting the set including the pieces of predetermined information for each pair including the read concretizing rule and an application part of the concretizing rule in the configuration requirement of interest, applying the set including the pieces of predetermined information to the calculation method to calculate a score, selecting the set including the pieces of predetermined information having the highest score among the sets including the pieces of predetermined information extracted for the respective pairs and the sets including the pieces of predetermined information that have been scored before and that have not been selected, and newly selecting, as a configuration requirement of interest, a configuration requirement obtained by applying, to a configuration requirement to which the pair corresponding to the set including the pieces of predetermined information is to be applied, the pair, in a case in which a new configuration requirement is input, select the new configuration requirement as a configuration requirement of interest, and in the search processing, in a case in which there are no sets including the pieces of predetermined information that have been scored before and have not been selected, select the set including the pieces of predetermined information having the highest score among the sets including the pieces of predetermined information extracted for the respective pairs.

\* \* \* \* \*